(12) United States Patent
Hollinger

(10) Patent No.: US 8,814,111 B2
(45) Date of Patent: Aug. 26, 2014

(54) PORTABLE MULTI-PURPOSE MAST FOR RAPID, SECURE ATTACHMENT TO UNSTEADY, INCLINED AND IRREGULAR SURFACES

(71) Applicant: Steven J Hollinger, Boston, MA (US)

(72) Inventor: Steven J Hollinger, Boston, MA (US)

(73) Assignee: Steven J. Hollinger, Boston, MA (US)

( * ) Notice: Subject to any disclaimer, the term of this patent is extended or adjusted under 35 U.S.C. 154(b) by 0 days.

(21) Appl. No.: 14/106,731

(22) Filed: Dec. 14, 2013

(65) Prior Publication Data
US 2014/0097321 A1    Apr. 10, 2014

Related U.S. Application Data

(63) Continuation of application No. 12/831,895, filed on Jul. 7, 2010, now Pat. No. 8,651,440.

(60) Provisional application No. 61/293,678, filed on Jan. 10, 2010, provisional application No. 61/290,061, filed on Dec. 24, 2009, provisional application No. 61/232,851, filed on Aug. 11, 2009, provisional application No. 61/225,707, filed on Jul. 15, 2009, provisional application No. 61/223,791, filed on Jul. 8, 2009.

(51) Int. Cl.
| | | |
|---|---|---|
| F16M 11/00 | (2006.01) | |
| F16M 11/04 | (2006.01) | |
| F16M 11/36 | (2006.01) | |
| F16M 11/32 | (2006.01) | |
| F16M 11/28 | (2006.01) | |

(52) U.S. Cl.
CPC ............. *F16M 11/046* (2013.01); *F16M 11/36* (2013.01); *F16M 11/32* (2013.01); *F16M 11/28* (2013.01)
USPC ...... 248/176.1; 248/511; 248/523; 248/218.4

(58) Field of Classification Search
USPC ............ 248/176.1, 176.3, 188, 188.8, 188.9, 248/508, 510, 220.21, 218.4, 121, 51, 74.5, 248/67.5, 511, 519, 523, 530, 539, 127, 156
See application file for complete search history.

(56) References Cited

U.S. PATENT DOCUMENTS 3,189,004 A * 6/1965 Sinclair ......................... 119/789
3,245,649 A * 4/1966 Cassidy et al. ................ 24/68 R
(Continued)

*Primary Examiner* — Terrell McKinnon
*Assistant Examiner* — Monica Millner

(57) ABSTRACT

A portable mast capable of supporting a payload that can be fastened to and detached from an unsteady, inclined or irregular surface of attachment. The improvements include a tensioning cable which exerts pressure on the base of the mast in opposition to the surface of attachment, a guide protecting the cable from abrasion, means for adjusting and retaining tension in the cable when the mast is fastened to the surface of attachment, a base capable of housing the fastener to protect the fastener from corrosion and tampering, a base allowing attachment to and pass-through of existing cords crossing the surface of attachment, and a base having resilient compression to conform to an irregular surface of attachment while maintaining pressure between the base and surface of attachment created by tensioning of the cable. Also disclosed is a mast with mechanical means for increasing cable tension in order to secure its tripod base to a surface of attachment. Also disclosed is a mast which can house standardized electronic components required by a variety of payloads, two masts which are capable of communicating with each other to synchronize the movement and operation of payloads, means for passing electronic signals from the surface of attachment through the mast to the payload, and a remote control for electronic communication with a transceiver housed within a mast to control the operations or movement of a payload.

11 Claims, 19 Drawing Sheets

(56) References Cited

U.S. PATENT DOCUMENTS

| | | | |
|---|---|---|---|
| 3,801,813 A * | 4/1974 | Kiehn | 362/391 |
| 3,866,619 A * | 2/1975 | Per Frisk | 135/114 |
| 3,983,605 A * | 10/1976 | Willenbring | 403/83 |
| 4,073,254 A * | 2/1978 | Marker | 114/90 |
| 4,141,117 A * | 2/1979 | Van Gompel | 24/136 R |
| 4,334,503 A * | 6/1982 | Carey, Jr. | 119/786 |
| 4,606,525 A * | 8/1986 | Lombardi | 248/460 |
| 4,741,528 A * | 5/1988 | Church | 482/63 |
| 4,832,296 A * | 5/1989 | Schnepp | 248/168 |
| 4,936,194 A * | 6/1990 | Horowitz | 52/155 |
| 5,031,566 A * | 7/1991 | Switzer | 114/361 |
| 5,322,386 A * | 6/1994 | Trangsrud | 405/19 |
| 5,353,747 A * | 10/1994 | Fain | 119/780 |
| 5,354,031 A * | 10/1994 | Bilotti | 248/519 |
| 5,573,028 A * | 11/1996 | van der Stigohel | 135/147 |
| 5,785,069 A * | 7/1998 | Glatz | 135/20.1 |
| 6,012,204 A * | 1/2000 | Roethler | 24/129 R |
| 6,032,599 A * | 3/2000 | Leboe | 114/39.12 |
| 6,131,969 A * | 10/2000 | Natkins | 292/323 |
| 6,303,857 B1 * | 10/2001 | Ginsburg | 174/45 R |
| 6,328,273 B1 * | 12/2001 | Kemikem | 248/530 |
| 6,820,573 B1 * | 11/2004 | McMullin | 119/791 |
| 6,824,331 B2 * | 11/2004 | Parker | 405/259.1 |
| 7,726,056 B2 * | 6/2010 | Brodie | 40/608 |
| 7,887,263 B2 * | 2/2011 | Moffat | 405/259.1 |
| 7,926,452 B1 * | 4/2011 | Kim | 119/796 |
| 8,025,125 B2 * | 9/2011 | Vetesnik et al. | 182/45 |
| 8,065,843 B2 * | 11/2011 | Timothy et al. | 52/149 |
| 8,230,648 B2 * | 7/2012 | Bulloch | 52/157 |
| 8,480,043 B1 * | 7/2013 | Ventura | 248/156 |
| 8,574,102 B1 * | 11/2013 | Russell | 473/425 |
| 2005/0199774 A1 * | 9/2005 | Reese | 248/529 |

* cited by examiner

PORTABLE MULTI-PURPOSE MAST FOR RAPID, SECURE ATTACHMENT TO UNSTEADY, INCLINED AND IRREGULAR SURFACES

CROSS-REFERENCE TO RELATED APPLICATIONS

This application is entitled to the benefit of U.S. patent application Ser. No. 12/831,895, Portable multi-purpose mast for rapid, secure attachment to unsteady, inclined and irregular surfaces, filed Jul. 7, 2010, now allowed, which claims priority from U.S. Provisional Patent Application Ser. No. 61/293,678, Portable mast having a universal adaptor head capable of hosting a variety of payloads, filed Jan. 10, 2010, and also, U.S. Provisional Patent Application Ser. No. 61/290, 061, Portable mast capable of adapting to contoured and irregular surfaces of attachment, filed Dec. 24, 2009, and also, U.S. Provisional Patent Application Ser. No. 61/232,851, Portable multi-purpose mast for rapid, secure attachment to unsteady, inclined and irregular surfaces, filed Aug. 11, 2009, and also, U.S. Provisional Patent Application Ser. No. 61/225, 707, Stern light with internal tension cable for secure attachment and quick release, filed Jul. 15, 2009, and also U.S. Provisional Patent Application Ser. No. 61/223,791, Combined stern light and drain plug for attachment to a kayak's topside drain hole, filed Jul. 8, 2009. The entire contents of these applications are herein incorporated by reference.

STATEMENT REGARDING FEDERALLY SPONSORED RESEARCH DEVELOPMENT

Not applicable.

BACKGROUND OF THE INVENTION

1. Field of the Invention

The invention has generally to do with portable masts hosting payloads such as lights, cameras, flags, antennas, electric cables and electronic equipment.

2. Description of Related Art

A conventional camera tripod hosts a camera atop a three-legged mast. Tie-downs for portable tripods are available commercially. Typically in these products, a cable is disposed between a point at the lower end of the camera mast at the apex of the tripod and a fixed point on the surface of attachment. The cable is pulled into tension, creating a force generally perpendicular to the surface of attachment, opposed by the tripod legs outwardly disposed at three points around the tensioning cable.

U.S. Patent #2007/29014 describes an "Apparatus for stabilizing a tripod."

Electronic docking systems with a dual-purpose mount that both passes electronic signals and holds the payload securely are known in prior art. An example is the Apple iPod dock which has a base mating to a surface of attachment and a mount at the distal end of the dock which holds an iPod securely while providing power and electronic signals to the iPod.

Universal adaptor heads are known in prior art. For example, tripods of prior art have a tilting, swiveling head with a standardized threaded screw (i.e. ¼"-20) to interface with a variety of cameras.

Ball and socket adaptors at the distal end of a fixed mast are known in prior art. For example, Helping Hands is a commercially available tool that functions as a mast with a variety of payloads. Helping Hands has a weighted base, arms extending from the weighted base, steel ball joints at the distal end of each arm, and a dual-socketed coupler connecting ball jointed arms with any number of ball-jointed payloads such as an alligator clip or magnifying glass.

Universal payload housings with standardized connection points are known in prior art. The RAM Mounts company produces a ball-shaped universal adaptor head which accepts a wide variety of accessories, each providing a socket to mate with the ball-shaped adaptor. The RAM Mounts company also produces a universal adaptor head with the RAM ball-shaped mount on its distal end and a with a specialized, generally columnar, mechanically adjustable adaptor on its proximal end that can be enlarged for secure installation into third-party accessories having a wide variety of diameter openings. The RAM Mounts company also produces a waterproof box designed to secure and protect a wide variety of self-powered electronic devices, with the box itself capable of being mounted as a payload by further connection to a universal adaptor head at the distal end of a mast.

A single payload affixed to a surface attachment by separate, independent mounts having standardized fittings is known in prior art. "Sticky Pod" is the trade name of a relatively flat mount with suction cups on its underside for attachment to a smooth surface and having a standardized fitting on its upper side for attachment to a payload. In application, multiple Sticky Pods have been used to secure a single large payload.

Standardized fittings for payloads that require electronic connections are known in prior art. Dental tools have a mount on which both mechanical actions and electronic signals can be passed to a variety of payloads such as drill bits, water jets and lights.

BRIEF SUMMARY OF THE INVENTION

The object of the invention is achieved by a mast which provides a stability to its payload by having a tubular center column; and having a base holding the center column; and the base having three or more points in contact with the surface of attachment; and having a cable within the base, terminated by a fastener; and the fastener capable of being fastened to a point on the surface of attachment; and having tension on the cable be the predominate force which marries and secures the base to the surface of attachment; and having a locking mechanism to maintain tension on the cable; and having stops to prevent the cable and its fastener from being fully withdrawn into the center column or removed from the mast when unfastened from the surface of attachment.

In another aspect of this invention, resilient tension provided by an elastic cable passing through the mast enables the mast to absorb, flex, respond to and recover from extraordinary force in order to protect the surface of attachment, mast and payload from impact.

In another aspect of this invention, the cable's inelasticity secures the base to the surface of attachment such that the fastener at the end of the tension cable is entirely contained within the mast's base and protected from theft or tampering.

In other aspects of the invention, a cable guide tube with a narrow diameter relative to the diameter of the mast ensures that the tension cable emerges from the base generally along the central axis of the mast, thereby improving the tension cable's function in providing resistance to the load arm of the mast as it acts as a lever with the edge of the base being the fulcrum over which the mast is tipped.

In other aspects of the invention, the entrance to the cable guide tube at the entrance to the mast is contoured to protect the cable from abrasion.

In other aspects of the invention, the tension cable has a manually positioned cord lock along its length at the portion of the cable where it emerges from the mast, capable of being moved near the cable's exit from the mast to maintain tension and otherwise allowing for a release of tension.

In other aspects of the invention, a housing such as a lockbox prevents tampering with the cord lock at its point of access where it exits the mast's core.

In other aspects of the invention, a cord lock may require the use of a key, a combination, or similar locking means to restrict unauthorized readjustment of the tension cable once the mast is in place.

In other aspects of the invention, a fixed cleat is mounted on the mast's external surface as an alternative to a cord lock to provide a rapid method for maintaining tension on the cable.

In other aspects of the invention, the base is notched to avoid conflict with existing surface protuberances or existing parts such as a pre-existing tie-down cord crossing the surface of attachment.

In other aspects of the invention, the base has fins or gussets to improve stability.

In other aspects of the invention, the base has legs such as on a camera tripod to improve stability.

In other aspects of the invention, the legs are individually adjustable to ensure that the mast stands at a particular orientation with respect to the surface of attachment.

In other aspects of the invention, the mast may swivel on the base to ensure that the mast stands at a particular orientation with respect to the surface of attachment.

In other aspects of the invention, the base is manufactured as a unified part of the mast.

In other aspects of the invention, the base is manufactured as a separate part from the mast and the mast may be affixed or inserted to the mast after the manufacturing process.

In other aspects of the invention, the mast's base may have a central axis that is independent from the central axis of the mast, allowing, for example, the base to be mounted to the side of a canoe while the mast stands upright, parallel to the surface of attachment.

In other aspects of the invention, the mast's orientation with respect to its base may be adjustable and lockable to a desired position; and in its locked position the mast (as in other embodiments of this invention) becomes the load arm of a simple lever with the base's perimeter edge being a fulcrum and the tension cable passing through the core of the mast into the base acting as the resistance to the input load.

In other aspects of the invention, the mast or payload may be manually swiveled or motorized to allow for the 360-degree scanning operation of a camera or spotlight.

In other aspects of the invention, a manual winch is mounted on the mast's external surface to provide necessary force on the tension cable.

In other aspects of the invention, a motorized winch is mounted within the mast's core to provide necessary force on the tension cable.

In other aspects of the invention, a manual handcrank and gear assembly allows the center column of a tripod to raised away from the legs in order to pull a fastener away from a surface of attachment; and thereby increasing tension between the center column and surface of attachment; and thereby creating forces in opposition to one another between the base and the surface of attachment.

In other aspects of this invention, a generally inelastic cable forces compression of the base to provide pressure on the surface of attachment opposing the base.

In other aspects of this invention, a generally inelastic cable forces compression of spring-loaded points existing at the perimeter of the base to provide pressure on the surface of attachment opposing each respective point.

In other aspects of this invention, the mast has a universal head capable of hosting a variety of payloads. Such a head may be spherical so that a ball-and-socket coupler can be used to connect with a payload having a ball-shaped base.

In other aspects of this invention, electric power and data signals pass through a standardized fitting at the mast's head to any compatible payload. The source of the data and power may be from self-contained electronics within the mast or from electronics passed to the mast through its base from the surface of attachment.

In other aspects of this invention, the mast provides a protective housing for an antenna, wireless transmitter and receiver, power supply, or other logic that itself becomes available as a logic source, communications capability or energy source for use by the payload once attached to the mast's universal adaptor head.

In other aspects of this invention, the base of the mast includes an interface, plug or fitting that mates with a matching receptacle on the surface of attachment, allowing the mast to provide power and electronic data to its payload while remaining detachable and portable.

Another object of the mast of this invention is to have a head that allows for the manual repositioning of the payload with respect to the surface of attachment.

Another object of the mast of this invention is to have a head that can be mechanically capable of moving the payload in response to self-contained logic, or remote controlled logic, or network-based instructions from a variety of external and internal logic components.

Another object of the mast of this invention is to provide information regarding the payload, such as weight and position, to external components in order to effect a change in the function or orientation of the payload with respect to the surface of attachment.

A further objective of the mast of this invention is to communicate in cooperation with other masts, together capable of holding a single payload, and each connected to that payload through a standardized mount.

A further objective of the mast of this invention is to work in cooperation with other masts, each capable of holding a unique payload, each connected to the payload through a standardized mount, and each cooperating with each other to ensure the collaborative function of the multiple payloads.

DETAILED DESCRIPTION OF THE INVENTION

The need arises for a mast that is capable of hosting a payload at its distal end while remaining portable, lightweight, easily secured to and detached from a surface of attachment, theft-proof, damage-proof and easy to manufacture.

On a small scale, such a mast is useful for production of portable marine navigation lights, portable GPS mounts, cellphone mounts and other electronic device mounts and portable anemometers. On a larger scale, such a mast is useful for portable flagpoles, light poles, communications poles, antennas and wind energy generation poles.

The need further arises for a mast that is capable of containing and providing support components for its payload such as a power source, antennas, communication receivers and transmitters, logic that may be useful to a variety of payloads, and means for transmission of energy and electronic signals between the payload and the surface of attachment.

The need further arises for a portable mast that is capable of moving its payload using electromechanical means such as would be provided by mounting the payload atop a motorized gimbal at the distal end of the mast.

The need further arises for a portable mast that is capable of communicating its status, such as its spatial position relative to the surface of attachment, to a second mast in order to synchronize activities such as the positioning of a common payload or the positioning of individual collaborating payloads.

While some of the improvements described herein are applicable to a conventional mast or tripod, the portable mast of this invention is expected to be secured to a surface of attachment rather than relying on gravitational force or a permanent installation. The surface of attachment may be planar, such as the deck of a boat, contoured as on the deck of a kayak or irregularly shaped such as the found on a craggy rock. Unless otherwise described herein, it is anticipated that the surface of attachment, which is not a component of this invention but is required for securing a mast, includes a point of attachment such as an eyelet, pad eye or deck loop which itself is available to the mast of this invention.

The mast of this invention has a distal end, farthest from the surface of attachment, and a proximal end, closest to the surface of attachment.

Figure 1:
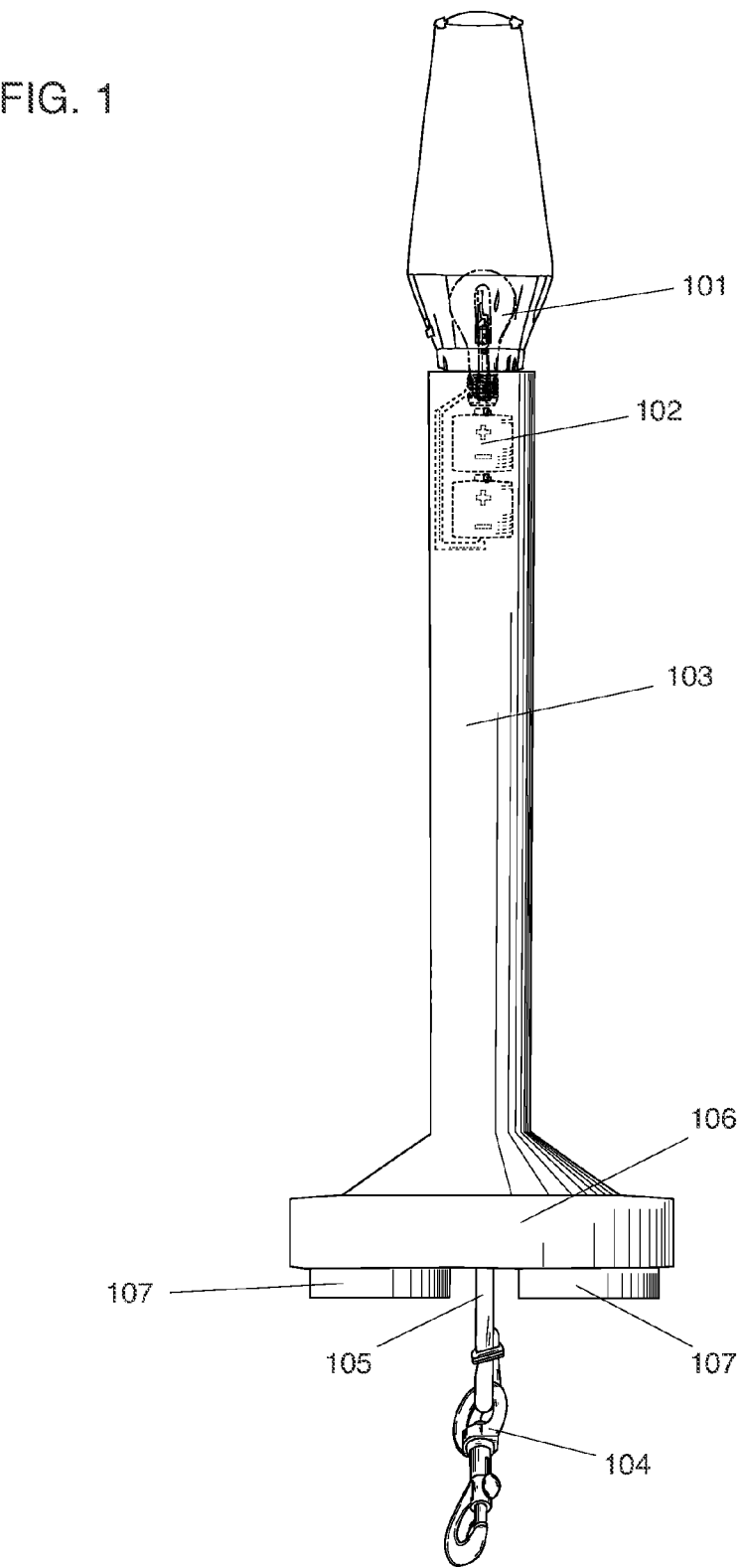
FIG. 1 shows a portable stern light as an example mast of this invention, having an internal tension cable.

In one embodiment of the mast of this invention, an elastic cable attached to a fixed point within the mast near its distal end passes through the mast and can be withdrawn from its proximal end. At the opposite end of the cable is a fastener such as a hook or clip which can be pulled from the proximal end of the mast and manually clipped to a point on the surface of attachment. The mast has a widened base, with its perimeter serving as a fulcrum to the mast's load arm as resistance is provided by the tension of the cable. An example of this mast is shown in FIG. 1. This example mast is a portable marine stern light having light bulb 101 and batteries 102 as payload of mast 103. Swivel clip 104 is attached to elastic bungee cord 105, which emerges from below widened base 106 and resilient foam cushions 107.

Figure 2:
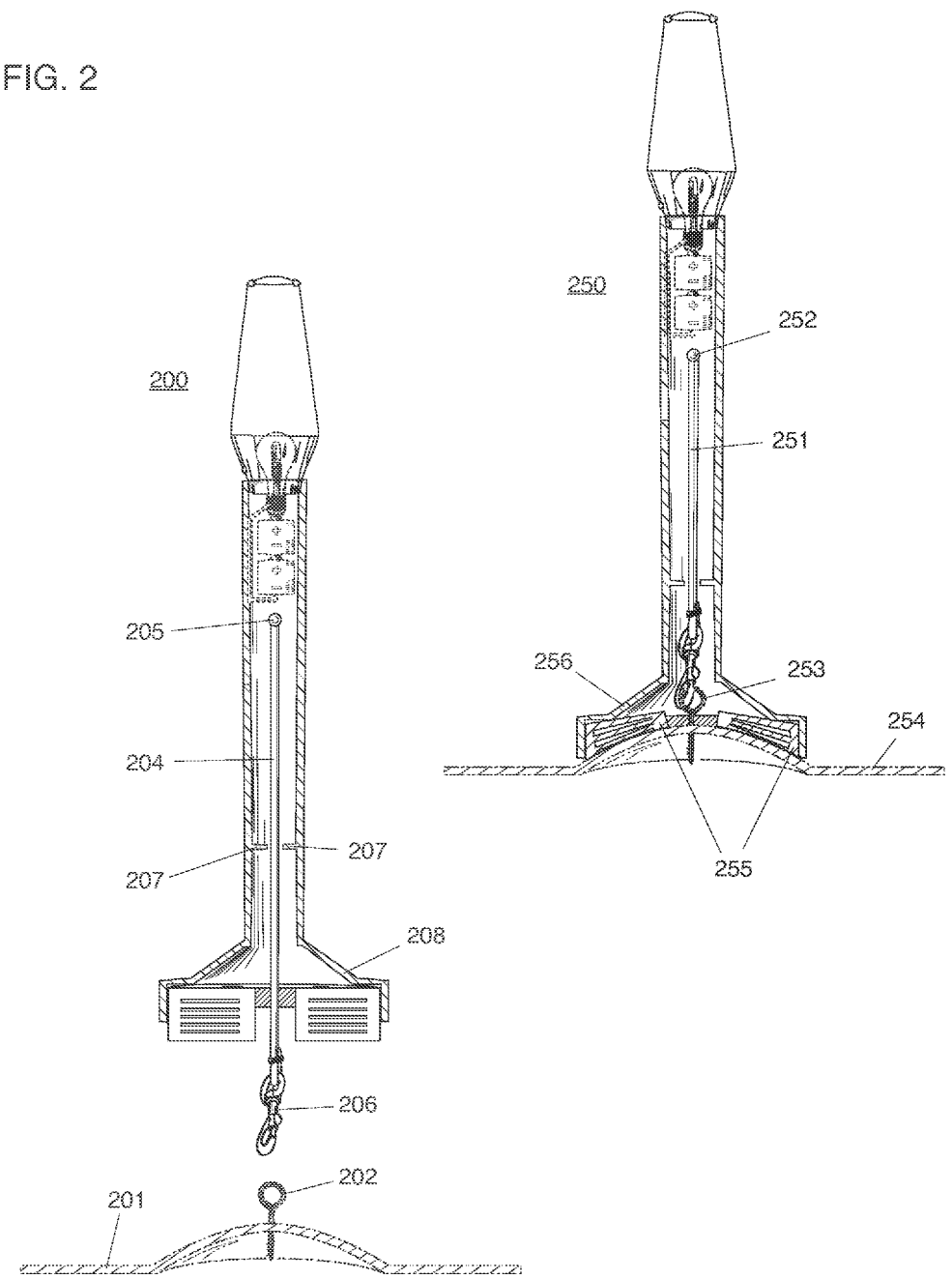
FIG. 2 shows the mast of FIG. 1 in two cross-sectional views, before and after the mast is secured to a surface of attachment.

The operation of the stern light of FIG. 1 is shown in cross-sectional views in FIG. 2. The view at 200 shows the stern light prior to its mounting on surface of attachment 201. Surface of attachment 201 is a curved surface with eye hook 202 at its apex. The cross-sectional view of stern light 200 shows that elastic bungee cord 204 is stretched outward from fixed point 205 at the distal end of the inside of the mast. Swivel clip 206 is pulled outside of the mast for attachment to eye hook 202. Swivel clip 206 is prevented from being withdrawn into the mast by collar 207. It is important to note that elastic bungee cord 204 is shown in stretched position as it would be when manually pulled out from under the mast. If the elastic cord was in a relaxed state, fastener 206 would rest within the lower portion of base 208.

The view of the stern light of FIG. 1 is shown in a cross-sectional view after being fastened to a surface of attachment at 250 in FIG. 2. Elastic bungee cord 251 exists in tension between fixed point 252 and eye hook 253 on the surface of attachment, thus marrying the stern light with surface of attachment 254. The curvature of surface of attachment pushes foam cushions 255 up and into base 256. Foam cushions 255 have resilience to provide the necessary compression that allows the stern light to conform to the shape of the surface of attachment while creating a marriage of surfaces suitable to produce friction necessary to keep the stern light stable. Absent this resilient foam, the base of the stern light would have difficulty mating to irregular surfaces.

The forces of tension in the elastic cord, compression in the foam cushions and pressure against the surface of attachment collectively create substantial friction necessary to hold the stern light firm against irregular and unsteady surfaces.

It is anticipated that the function of elastic cable of FIGS. 1 and 2 may be replaced by a coil spring or other tensioning means to pull the proximal end of the mast to the surface of attachment.

The mast of the preferred embodiment of this invention, similar to the mast of the aforementioned embodiment, is quickly secured to a surface of attachment by the fastening of a tension cable passing through the mast and base to a point on the surface of attachment existing at or near its intersection with the base's central axis. In this regard, force provided by the tension cable pulls the surface of attachment toward the proximal end of the mast's base, ensuring a secure marriage between the base and the surface of attachment. Unlike the earlier embodiment, the preferred embodiment of the mast of this invention provides means for manually increasing and relaxing tension in the cable passing through the mast and means for maintaining tension in the cable once increased.

The preferred embodiment of the mast of this invention has a widened round base. Mechanically, the mast responds to force as a simple lever, with the load arm being the mast's column, the fulcrum being an edge of the base and the resistance force being provided by the tension cable. The tension cable, on axis generally perpendicular to the plane of the base and generally centered with respect to the footprint of the base, ensures that force applied on the mast from any vector perpendicular to the mast will have opposing forces between the base and the surface of attachment exerted at a fulcrum point existing along the base's perimeter.

Figure 3:
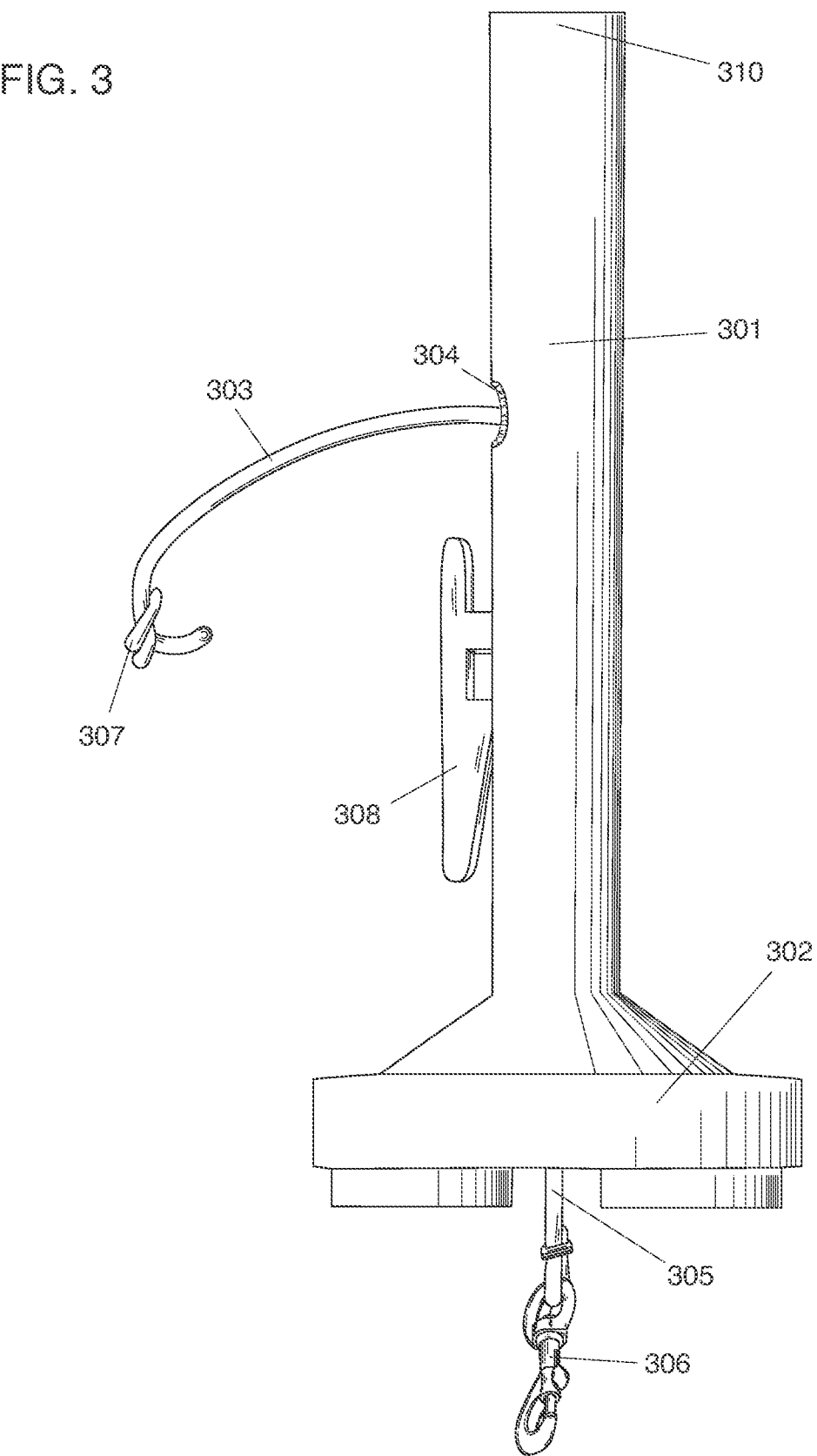
FIG. 3 shows an example of the preferred embodiment of the mast of this invention.

The preferred embodiment of the mast of this invention is exampled in FIG. 3. Vertical mast 301 is a rigid central column with widened base 302. Cable 303 passes into the mast through hole 304, which itself is at a midpoint on the mast, away from base 302. Cable 303 passes into the mast's hollow core, emerges from the center of the base at 305, and is terminated by snap swivel clip 306. Snap swivel clip 306 is capable of being fastened to the surface of attachment (not shown). Knot 307 acts as a cord stop to prevent the accidental retraction of cable 303 into the core of the mast. A conventional cord stop such as a hog ring can be used in lieu of a knot to ensure that access to this end of the cable is retained.

Jam cleat 307 is firmly unified with the mast to provide means for maintaining tension on cable 303 once it is pulled taut. The lower portion of jam cleat 307 is wedge-shaped to cinch the cord when it is wrapped around the cleat, allowing the user of the mast to quickly secure the cable without having to wrap it multiple times around the cleat.

Figure 4:
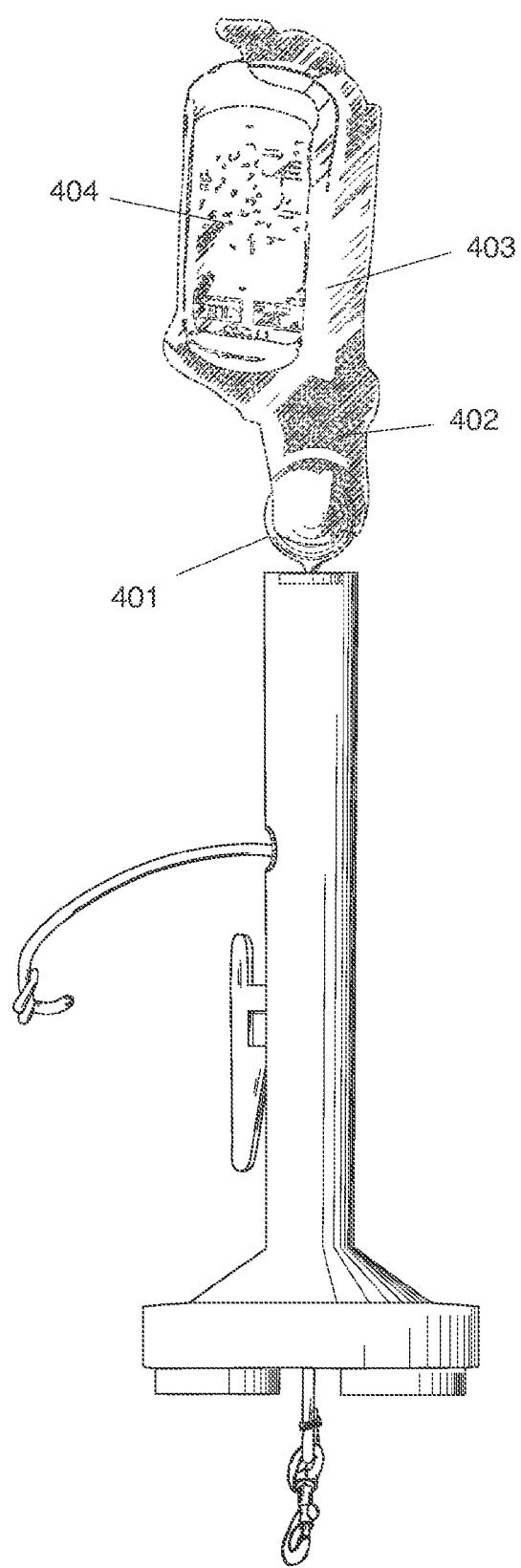
FIG. 4 shows the example mast of the preferred embodiment supporting a mobile GPS unit as an example payload.
Figure 5:
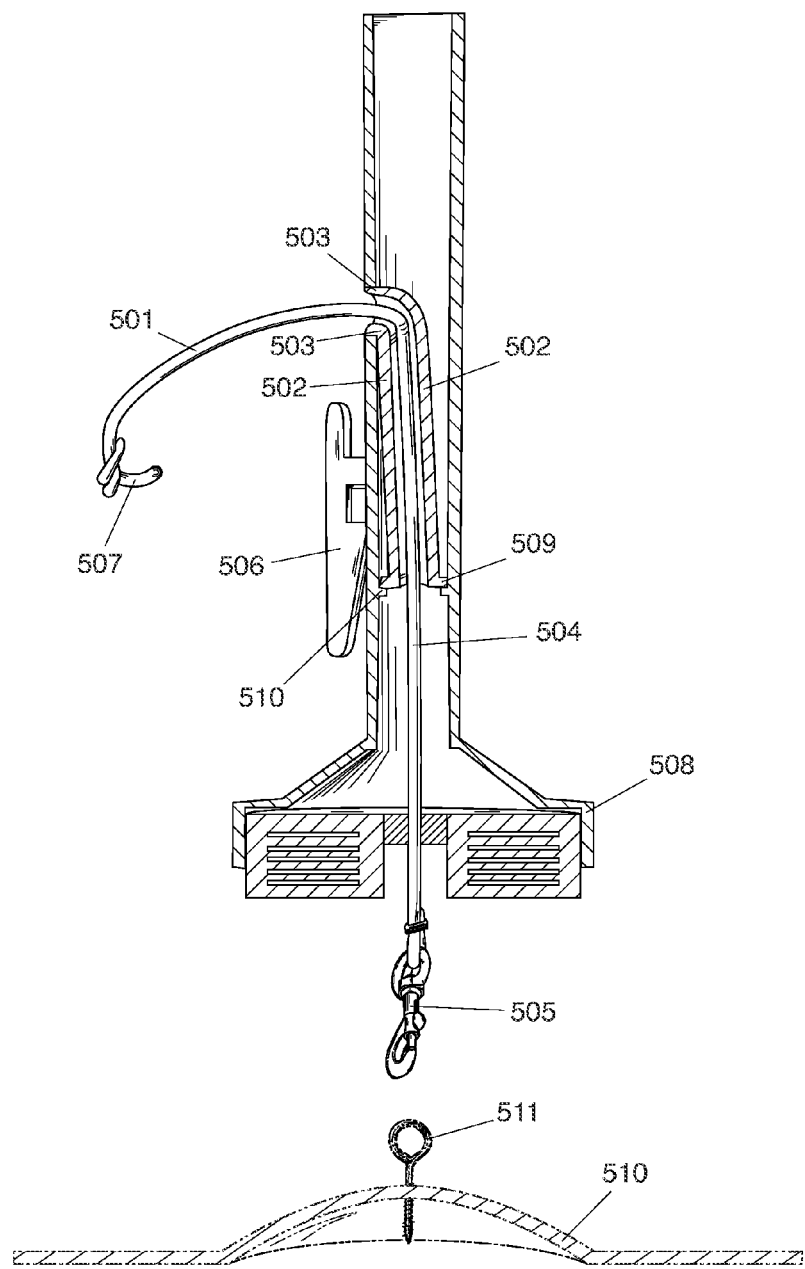
FIG. 5 shows a cross-sectional view of the example mast of the preferred embodiment of this invention revealing the tension cable and cable guide.

The mast of FIG. 3 has distal end 310, ready to accept the attachment of a payload such as a light or camera. FIG. 4 shows this preferred embodiment with the addition of a commercially available mobile GPS mount that is itself comprised of ball 401, swiveling socket 402, device cradle 403 and the electronic GPS unit at 404.

Operation of an example mast of the preferred embodiment is demonstrated in FIGS. 5, 6, 7 and 8. As shown in the cross-section of the mast in FIG. 5, elastic cable 501 passes into the mast through a second tube revealed as a cross-section at 502. This figure shows surface of attachment 510 and eye hook 511 before the mast is attached to it.

Tension cable 501 passes into the core of the mast and is guided so that it emerges from the proximal end of the mast at a point that is substantially centralized with respect to the footprint of the base, thereby maximizing resistance to force acting on the mast from any vector perpendicular to the mast and acting through a fulcrum at any respective perimeter edge of the base.

Cable guide 502 is a hollow tube that exists within the core of the mast, allowing the entry of tension cable 501 through the mast's opening at 503. The cable passes downward through cable guide 502 and emerges below base 508. Base 508 has an interior diameter that is larger than the maximum width of cable fastener 505 so the cable fastener may be withdrawn into the base. In this example, the fastener is slimmer than the diameter of the center column of the mast, so it can be withdrawn up and into the center column. To prevent the fastener from being withdrawn to the distal end of the center column, the foot of cable guide 502 at 509 serves as a collar.

One purpose of cable guide 502 is to keep the cable centralized with respect to base 508. The cable guide is centered to ensure that when tension is applied on the cable, the cable's fastener within the base will be centrally located with respect to any given perimeter edge of the base, and therefore optimally positioned to resist forces acting on the mast from various vectors. Absent this cable guide, the cable would have greater freedom of movement within the entire diameter of the mast, reducing its efficiency in providing resistance to force.

A second purpose of the cable guide is to prevent abrasion of the tension cable. The curved portion of the cable guide at 503 is contoured to accept and distribute stress applied as the cable is pulled tense. Here, the curved portion carries forces acting on its surface as the cable is pulled outwardly from the mast, and downwardly toward jam cleat 506. Absent the curved contour at 503, the cable would be susceptible to abrasion on a sharp edge of the mast.

It is anticipated that the anti-abrasion function of the rounded edge at the mouth of the cable guide may be served by a rounded edge on the mast's opening, or by a contoured convex surface at the mast opening without requiring inclusion of an entire cable guide tube inside the mast.

Figure 6:
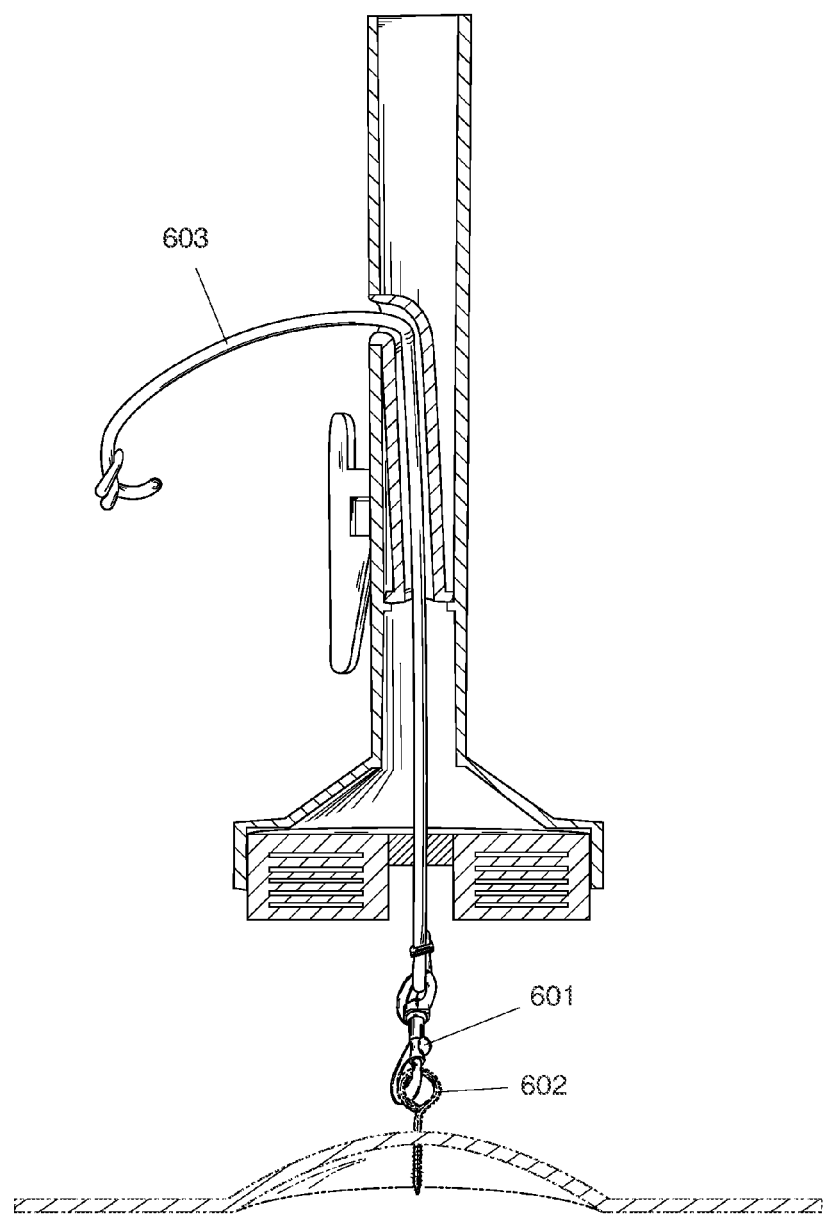
FIG. 6 shows a cross-sectional view of the example mast of the preferred embodiment of this invention fastened to a surface of attachment.

FIG. 6 shows a cross-section of the example mast of the preferred embodiment after the swivel clip 601 has been clipped onto eye hook 602 on the surface of attachment. Once clipped, the user of the mast can begin to pull cable 603 taut in order to marry the base of the mast with the surface of attachment.

Figure 7:
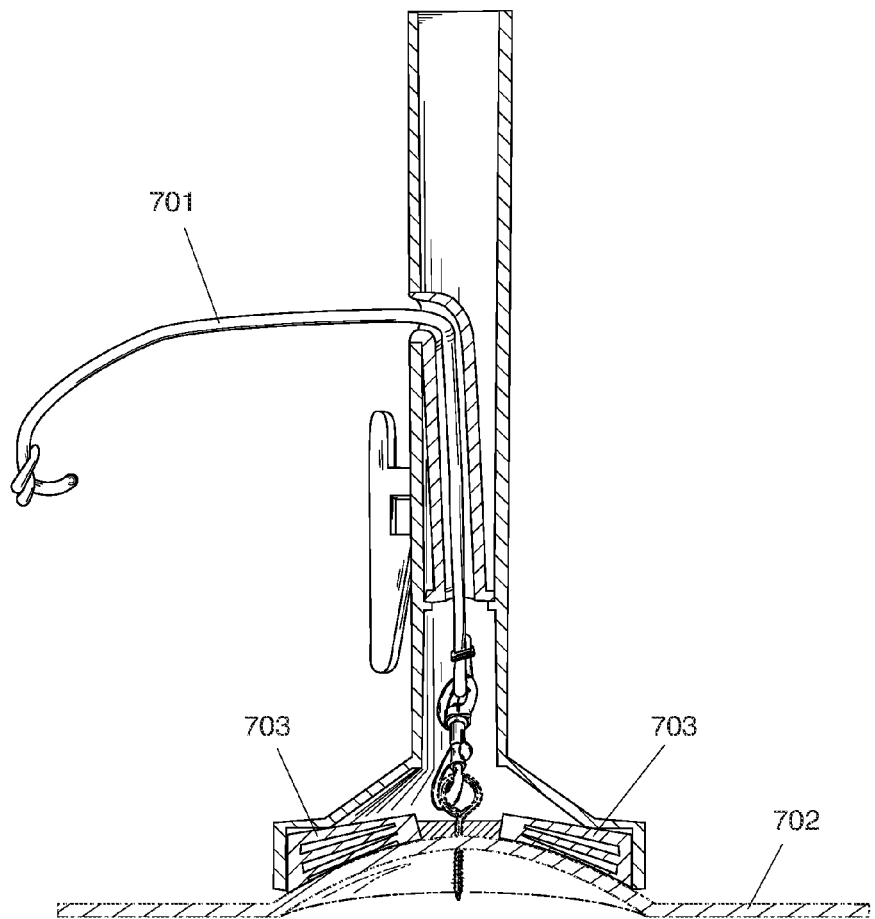
FIG. 7 shows a cross-sectional view of the example mast of the preferred embodiment of this invention pulled in tension against a surface of attachment.

FIG. 7 shows a cross-section of the example mast of the preferred embodiment after cable 701 has been pulled taut. The elasticity of cable 701 provides necessary tension, required to create friction between the mast and the surface of attachment, and thereby improving stability of the mast. The base of the mast is mated with surface of attachment 702 and the curved portion of the surface of attachment has compressed the foam cushions 703 within the base of the mast. The compression of foam cushions 703 further improves stability of the mast by increasing surface friction between the mast and the surface of attachment. Foam cushions 703 also enable the mast to be secured to an irregular surface of attachment, conforming to meet the irregularities of the surface as the cable is pulled taut.

Figure 8:
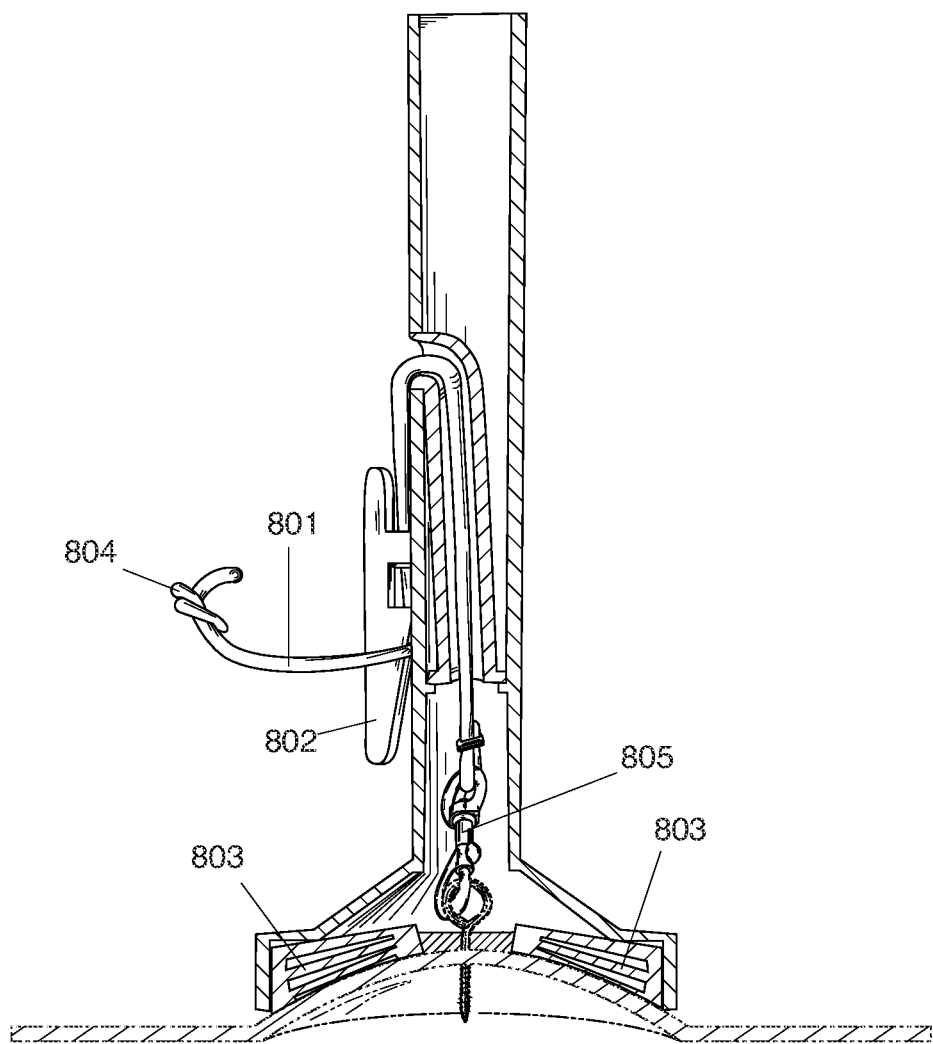
FIG. 8 shows a cross-sectional view of the example mast of the preferred embodiment of this invention with its tension cable cinched to retain pressure against the surface of attachment.

FIG. 8 shows a cross-section of the example mast of the preferred embodiment after cable 801 has been cinched under jam cleat 802 to maintain tension in the cable and maintain compression in foam cushions 803. Knot 804 protects the mast from accidental loss if cable 801 comes free of cleat 802, by preventing withdrawal of the cable into the mast.

It is anticipated that rollers or other means to distribute forces acting on the tension cable may be provided in lieu of the curved opening of the cable guide in order to reduce abrasion and improve the application of tension between the base and the surface of attachment.

It is anticipated that the cable guide may not be an enclosed tube, but rather may be a series of eye loops, pulleys, or any other means to restrain the cable within the core of the mast so that it remains substantially centered with respect to the mast's base, particularly near the point of attachment on the surface of attachment.

Although the cable of the mast of the preferred embodiment, examined as cable 801 in FIG. 8, is described as an elastic cable, it is anticipated that an inelastic cable may be used for specific applications. The elasticity of the cord is expected to vary with each application. In applications with light payloads that are advantaged by a measure of flexibility, a bungee cord with elastic tension may be used. In applications with heavy payloads or where forces acting on the mast are significant, aircraft cable with fairly constant tension may be used.

Inelastic cable such as aircraft cable provides a measure of theft protection because it prevents the mast from being lifted to expose the fastener beneath the base once attached to the surface of attachment. Elastic cable such as a bungee cord provides flexibility if the mast is expected to encounter and flex in response to extraordinary force. Such flexibility allows, for example, the mast to be forgiving of otherwise bending or breaking forces and also allows for the recovery of the mast after encountering such significant force.

It is anticipated that the fastener of the mast of this invention, examined as a snap swivel clip 805 in FIG. 8, may be a clip, hook, magnet, carabiner, knot, suction cup or any other means for securing a cable to a surface of attachment.

It is anticipated that the jam cleat of the mast of this invention, examined at 802 in FIG. 8, may be a cam cleat, clam cleat, hand-cranked or mechanical winch or other device permanently affixed to the mast and capable of temporarily preventing entry of cable into the mast while retaining tension between the cable and the fastener at the proximal end of the mast.

It is anticipated that the optional cord stop of this invention, examined as knot 804 in FIG. 8, may be a crimped end, knot, plastic cord stop or any other object capable of preventing the cable from being withdrawn into the core of the mast. It is anticipated that the function of a cord stop may be achieved by tying the cable end onto a cleat or a fixed fastening point on the exterior surface of the mast. It is anticipated that the cord stop may be a hook or fastener that enables the cable's bitter end to be attached to a point on the surface of attachment away from the mast, or to another surface, in order to improve stability of the mast.

While the mast of the preferred embodiment is married to the surface of attachment so that it is disposed generally perpendicular to the surface, it is anticipated that the mast may be curved or shaped to position its payload in a desired orientation with respect to the surface of attachment. An example mast shown in a cross-sectional view in FIG. 9 demonstrates that the tensioning cord can be pulled taut in order to marry the base of the mast with the surface of attachment without requiring a perpendicular relationship between the main portion of the mast and the surface of attachment. Mast 901 would be generally parallel to the surface of attachment, useful for a stern light that was side mounted on a canoe, for example.

Figure 9:
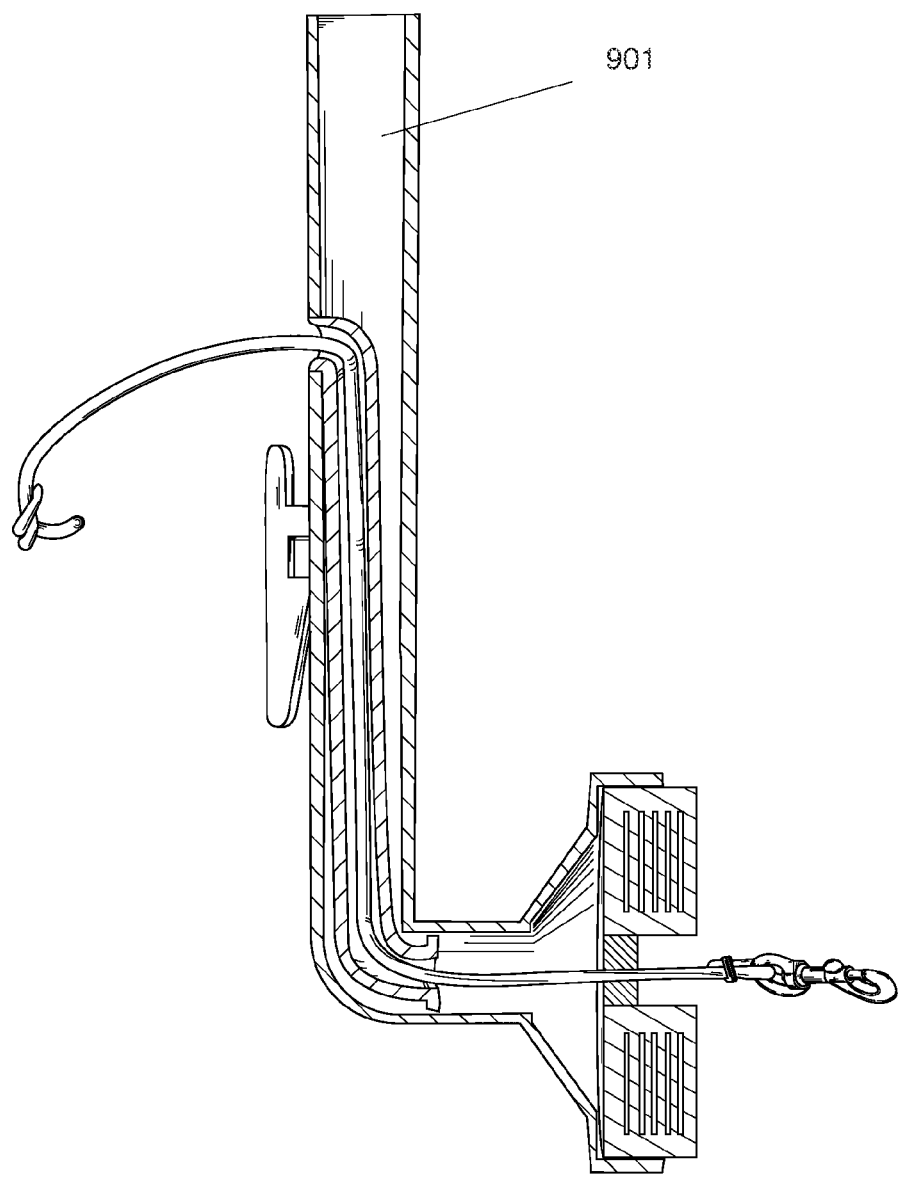
FIG. 9 shows a cross-sectional view of an example mast of this invention capable of hosting a payload on an axis parallel with the plane of the surface of attachment.

The example mast of FIG. 9 demonstrates that, similar to other embodiments of the mast of this invention, the tension cable passing through the core of the mast and base is capable of applying force on a vector which is substantially on axis with the central axis of the base, generally perpendicular to the surface of attachment, thereby forcing the base to mate securely with the surface of attachment. It is anticipated that such a mast may be manufactured as a separate component from the base; and further allowing the mast to swivel on the base to a particular orientation; and further allowing the mast to be locked in place relative to the base; and the base remaining married to the surface of attachment while the mast orientation is adjusted.

In another embodiment of the mast of this invention, a cord lock is used instead of a fixed fastener on the mast to maintain tension in the cable. An example of this embodiment is shown in two crossectional views in FIG. 10. Cord lock 1001 on mast 1000 can be positioned at any point along cable 1002. The same cord lock, seen at 1051 on the mast cross-section shown at 1050, can be positioned at the opening in the mast when cable 1054 is pulled taut. The cord lock restrains the cable from withdrawing into the mast, so tension is maintained on the cable and compression is maintained on foam cushions 1052.

Figure 10:
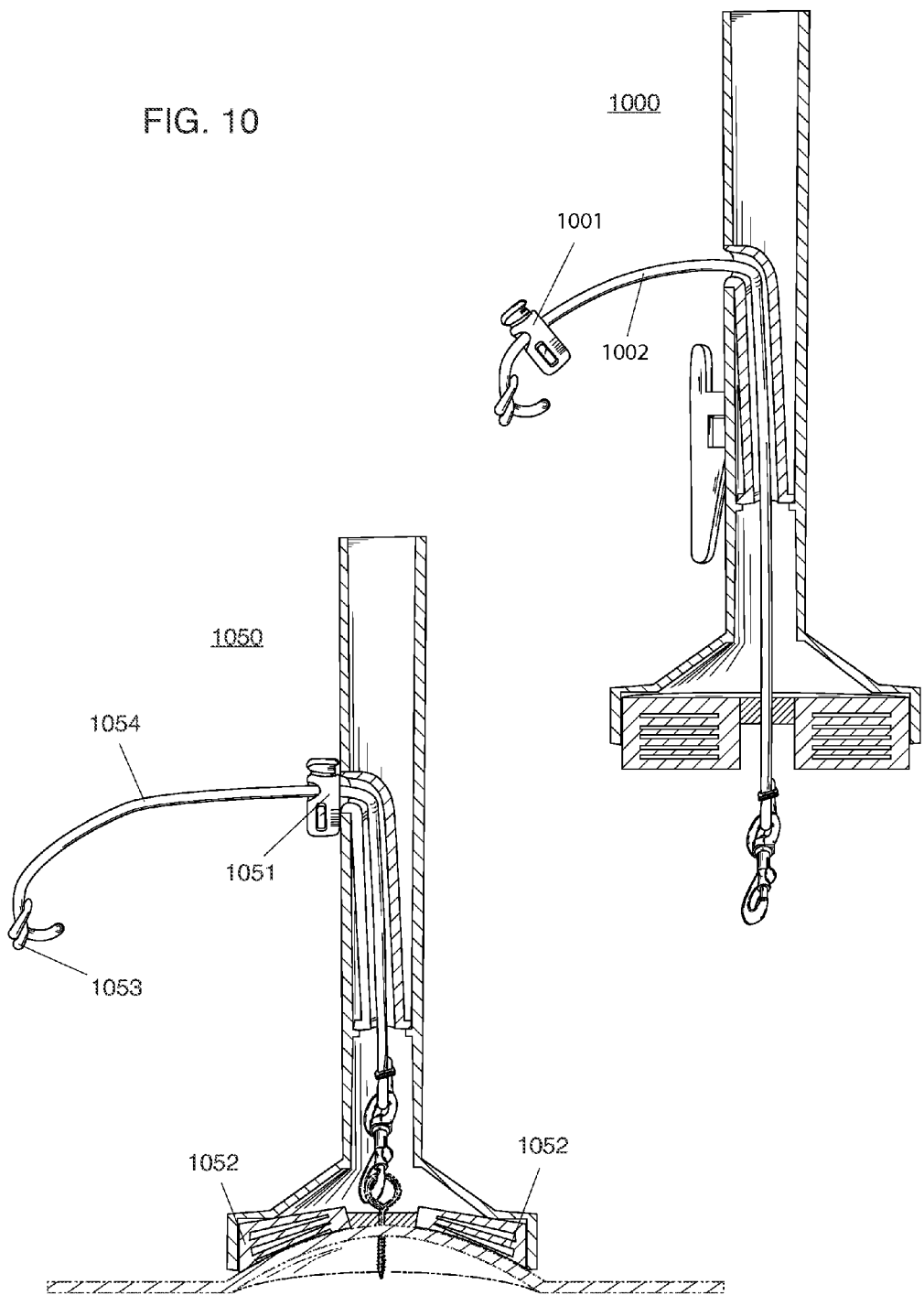
FIG. 10 shows two cross-sectional views of an example mast of this invention having a movable cord lock to maintain and release tension in the cable.

In normal operation, knot 1053 in FIG. 10 has no particular purpose and simply dangles at the loose end of cable 1054. In the event that cord lock 1051 becomes loose, however, knot 1053 prevents cord lock 1051 from falling off the end of the cable. Secondly, because knot 1053 is larger than the hole at the point of cable 1054's entry into the mast, the knot prevents the loss of the cable into the core of the mast, thus protecting the entire mast, cable and payload (not shown) from loss.

It is anticipated that the cord lock such as shown in FIG. 10 may be keyed or padlock protected for access only by authorized users. Such a cord lock would allow for the quick attachment and detachment of the mast, while providing a method for securing the mast to the surface of attachment in such a way that unauthorized access to the cable and fastener within the mast's core was not possible.

Figure 17:
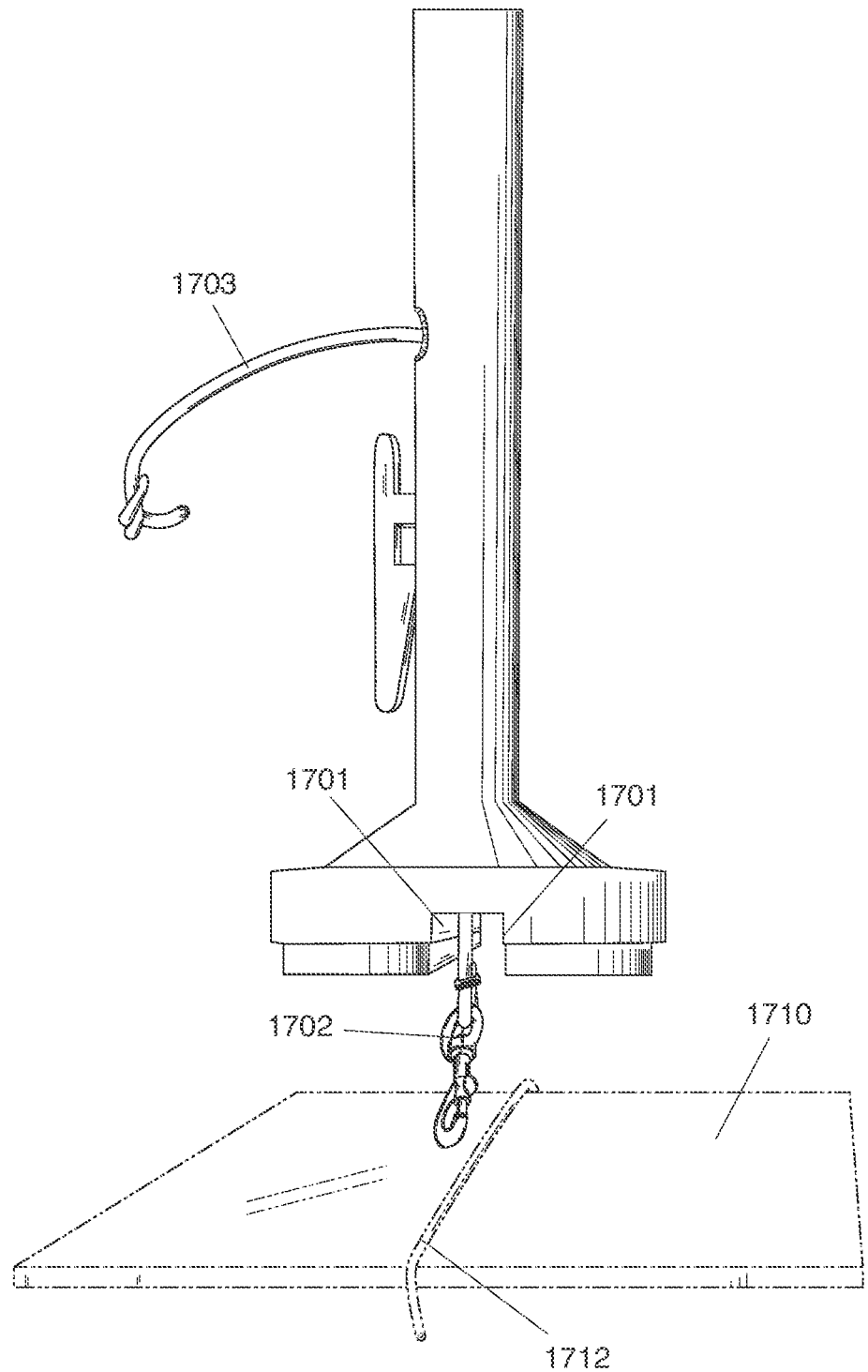
FIG. 17 shows an example mast of this invention having a notched base to allow pass-through of a pre-existing cable on the surface of attachment.
Figure 18:
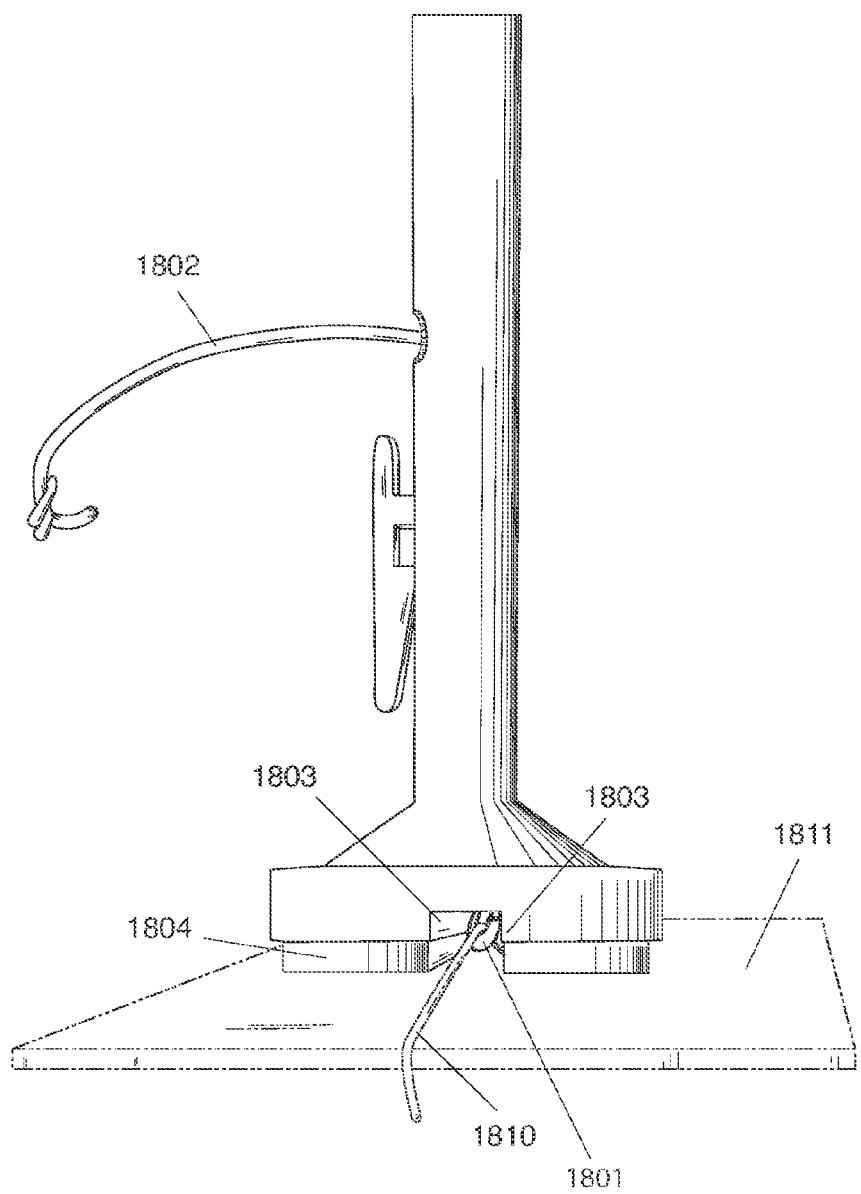
FIG. 18 shows the example mast of FIG. 17 fastened to the pre-existing cable on the surface of attachment, with its notched base allowing pass-through of the pre-existing cable so the base can sit flush with the surface.

In another embodiment of the mast of this invention, the base of the mast is notched to avoid conflict with protuberances on the surface of attachment necessary for securing the tension cable to the surface of attachment. For example, a bungee cable crossing the surface of attachment may be substantially taut so as to allow the mast of this invention to be clipped onto it. An example of such a notched base is shown in FIGS. 17 and 18. In FIG. 17, notch 1701 is visible below the base. Fastener 1702 is ready to be attached to a surface of attachment, at which point cable 1703 can be pulled into tension. In this view, surface of attachment (not a component of the mast of this invention) has taut bungee cable 1712 running across its surface (not a component of the mast of this invention).

The same mast can be seen in FIG. 18 after fastener 1801 has been clipped to taut bungee 1810, and cable 1802 has been pulled into tension. Fastener 1801 pulls up taut bungee 1810, and notch 1803 makes it possible for base 1804 to sit flush atop surface of attachment 1811 while bungee cord 1810 passes from one side of the surface, through the fastener clip, and to the other side of the surface of attachment.

In another embodiment of the mast of this invention, a winch affixed to the mast prevents the withdrawal of the cable into the core of the mast and to provide means for increasing tension on the cable. No cord stop or cord lock is required in this embodiment because the end of the cable is coiled within the winch's reel. It is anticipated that an electric winch may be used to apply tension on the cable. Furthermore, because the manual application of force (e.g. via a hand-crank) would not be required with the use of an electric winch, such a winch could be housed entirely within the mast. An internal winch could, for example, be located at point 205 on example stern light 200 in FIG. 2, where it could be enabled by an external switch to increase or decrease tension on cable 204.

Figure 11:
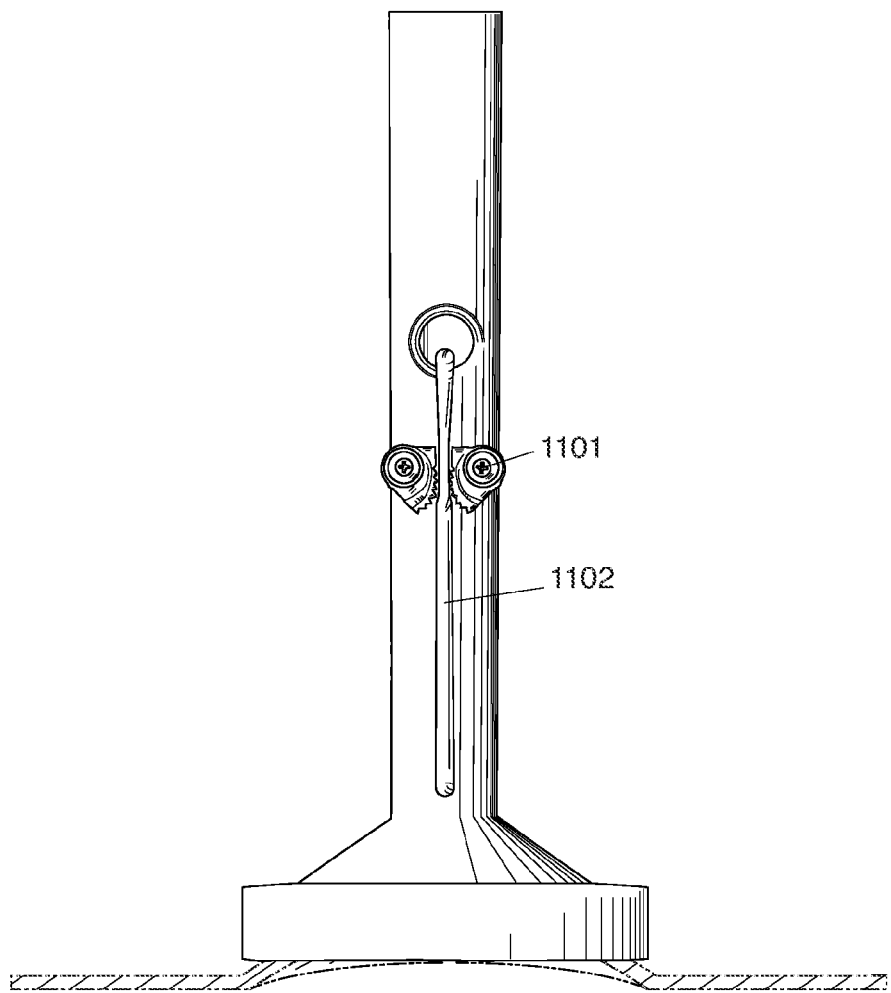
FIG. 11 shows an example mast of this invention having a cam cleat to regulate and maintain tension on the cable.

Another example of the mast of this invention is shown in FIG. 11. This mast functions similarly to the mast of the preferred embodiment, however this example uses cam cleat 1101 instead of a jam cleat to maintains tension on cable 1102 when the cable is pulled taut.

It is anticipated that the jam cleats, cam cleats and winches of aforementioned examples and embodiments may be keyed or padlock protected for access only by authorized users. Such a lock would allow for the quick attachment and detachment of the mast, while providing a method for securing the mast to the surface of attachment in such a way that unauthorized access to the cable and fastener within the mast's core was not possible.

In another embodiment of the mast of this invention, the base such as exampled at 106 in FIG. 1 may be manufactured as a separate component from mast body 103. The base may be permanently affixed to the mast using an adhesive, for example, or the base may by attached to the mast using a temporary fastener such as a spring pin, which would allow for the routine insertion and detachment of the mast body from the base.

Figure 19:
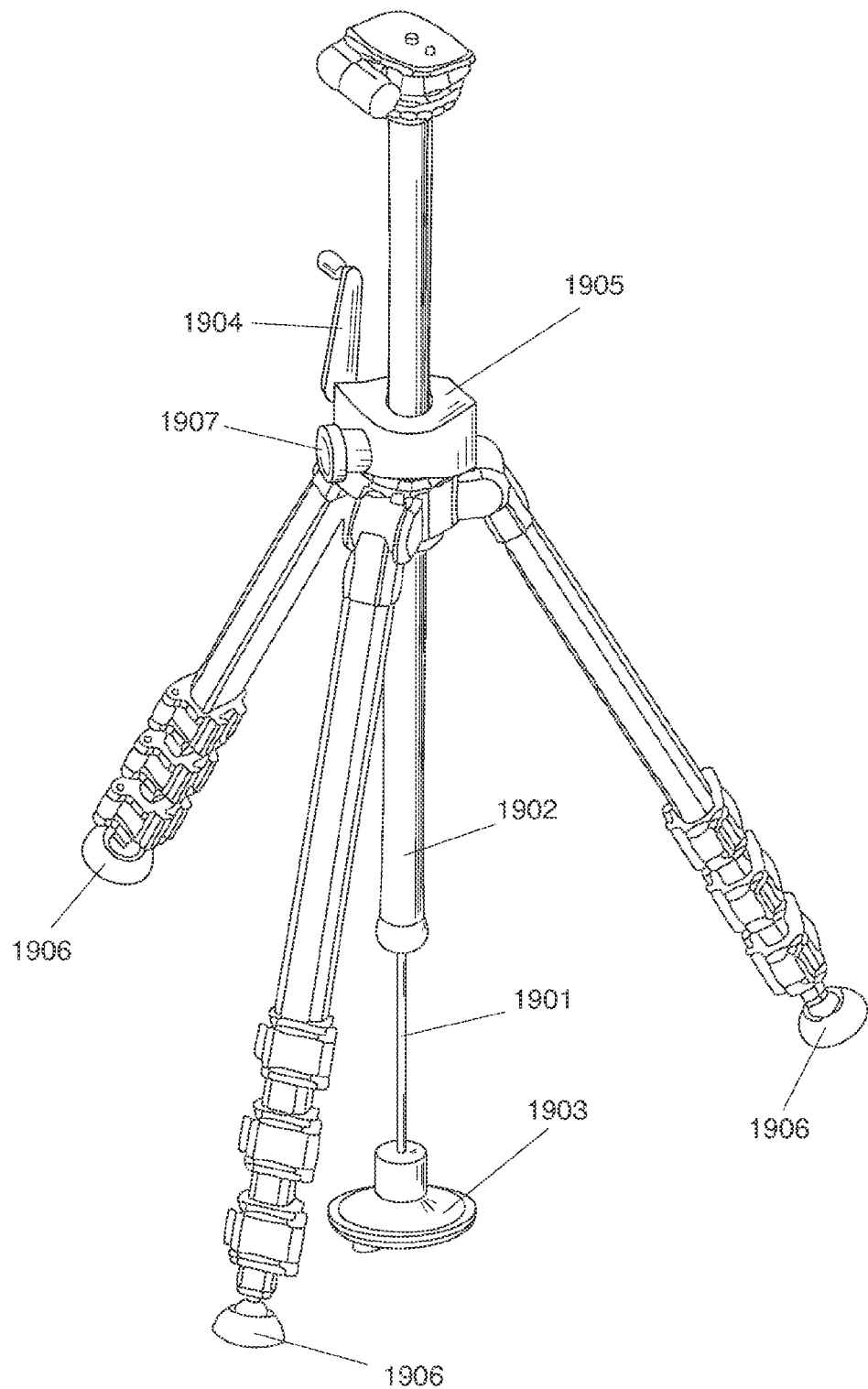
FIG. 19 shows an example mast of this invention expressed as a tripod, having a manual handcrank to raise the center column and thereby increase tension between the legs and surface of attachment.

Conventional camera tripods often provide a handcranked gear assembly which raises or lowers the center column carrying the camera. In another embodiment of the mast of this invention, the center column of such a tripod is combined with a cable and fastener so that the center column is raised in order to increase tension between the base and the surface of attachment, thereby securing the tripod to the surface of attachment. An example of this embodiment is shown in FIG. 19. Cable 1901 is attached to the proximal end of center column 1902. Cable 1901 is also attached to suction cup 1903. Center column 1902 can be raised and lowered by handcrank 1904 and gearbox 1905. In operation, suction cup 1903 is affixed to the surface of attachment and handcrank 1904 is manually turned to raise center column 1902, increasing tension on cable 1901 and providing pressure on feet 1906 in opposition to the surface of attachment. Center column lock 1907 is tightened to maintain the position of center column 1902 and also to maintain tension on cable 1901. It is anticipated that cable 1901 may be inelastic or elastic depending on the application, and that the legs of the tripod may be compressible as described in another embodiment of the mast of this invention.

Figure 12:
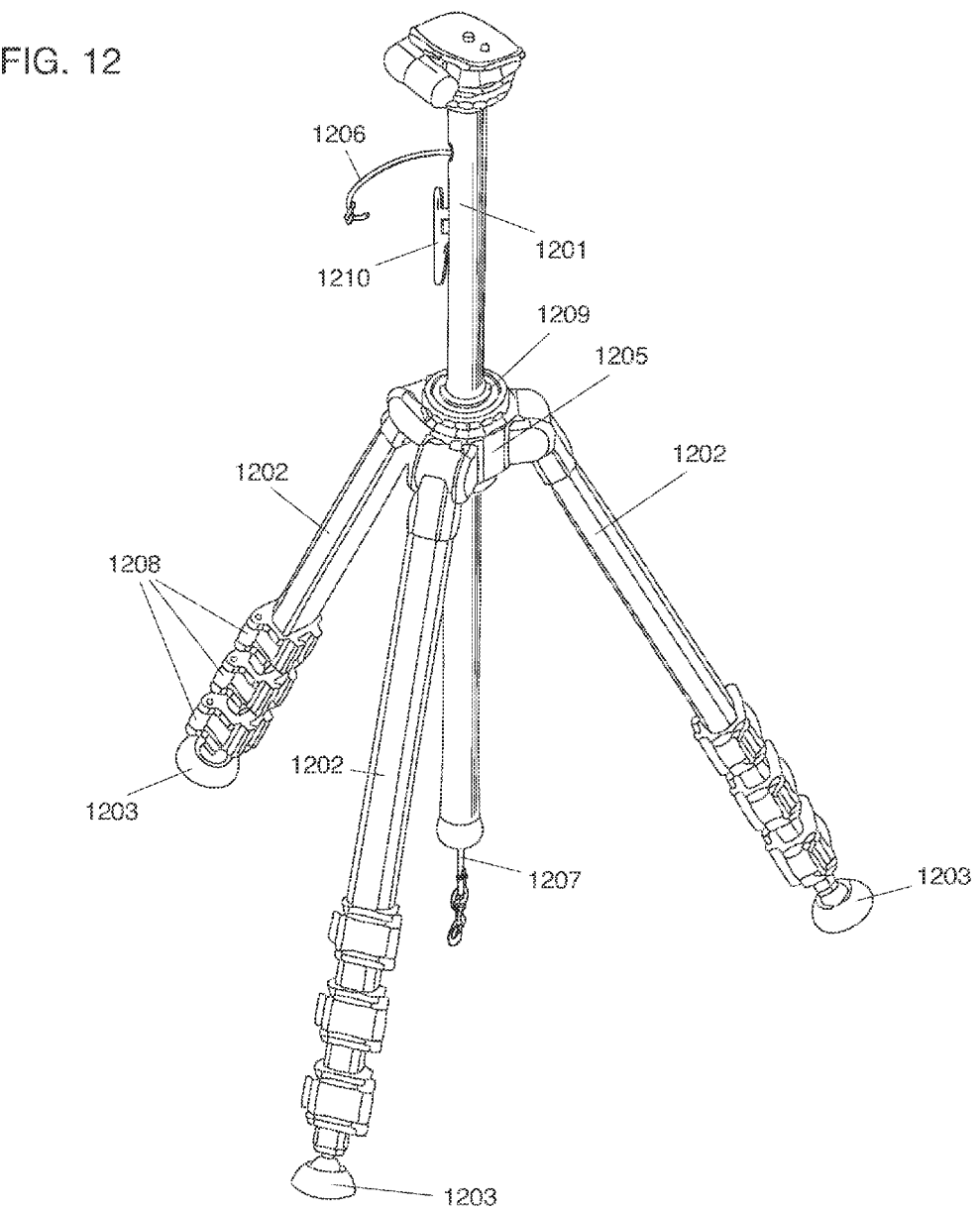
FIG. 12 shows an example mast of this invention expressed as a tripod.

Another embodiment of the mast of this invention is exampled in FIG. 12. Here, center column 1201 passes through sleeve 1209 within tripod body 1205. Legs 1202 and feet 1203 together provide a wide, stabilizing footprint to the narrow mast of the tripod. Tension cable 1206 passes through a cable guide within the center column, emerging from the proximal end of the tripod at 1207 where it can be fastened to the surface of attachment, marrying tripod feet 1203 to the surface of attachment (not shown). Jam cleat 1210 allows cable 1206 to be pulled taut and cinched, maintaining tension on the cable as the tripod is pressured against the surface of attachment. As shown, tripod legs 1202 have variable length extensions 1208 to allow for the adjustment of individual feet, ensuring that the center column 1201 remains vertical while the tripod remains stable on an uneven surface.

Figure 13:
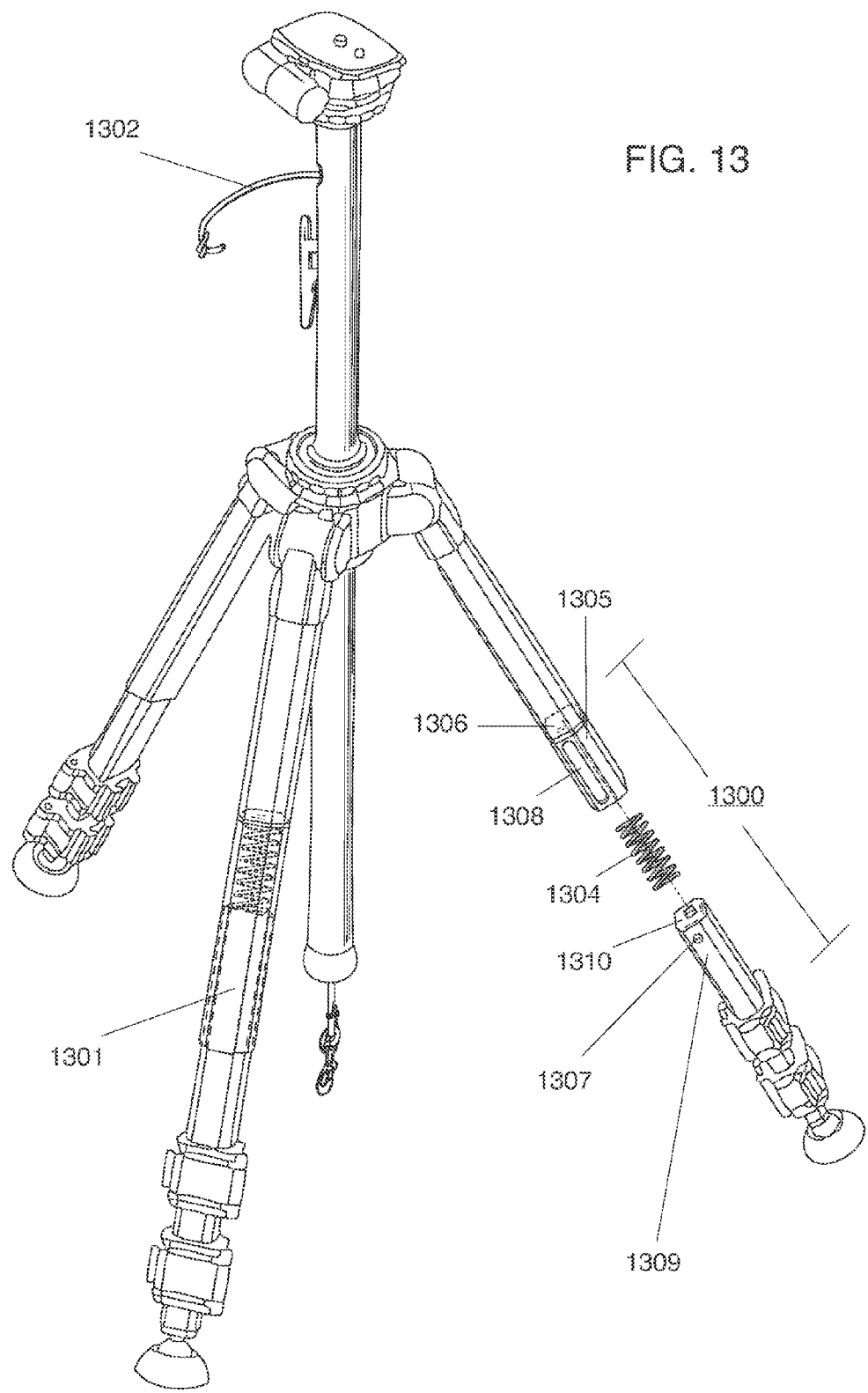
FIG. 13 shows an example mast of this invention expressed as a tripod having resilient, compressible leg extensions.

Another embodiment of the mast of this invention is a tripod similar to that exampled in FIG. 12, further improved by the addition of tensioned leg extensions that are compressed when the cable is pulled taut to marry the tripod with a surface of attachment (not shown). These tensioned legs function similarly to the foam base of the mast of the preferred embodiment, advantaging the tripod by providing resilient compression required to produce the necessary friction between the tripod feet and the surface of attachment. Such compression is necessary particularly if the tensioning cable is fairly inelastic and incapable of maintaining pressure between the mast and the surface of attachment. An example of such a tripod is shown in FIG. 13, with tension cable 1302 and a hidden view of a spring-loaded leg extension at 1301. Assembly view 1300 of the extension leg shows that spring 1304 is housed within leg housing 1305 and is restrained on one end by fixed stop 1306 and on the other end by fixed stop 1310. Button 1307, which moves within guide slot 1308, prevents leg extension 1309 from being entirely withdrawn from leg housing 1305.

In another embodiment of the mast of this invention, the mast's payload may be mounted on a swivel atop the mast to allow for the 360-degree scanning of a spotlight or camera. It is anticipated that a mechanical control cables may be provided to an operator, such as a kayaker, in order to allow for the remote, manual rotation of a swiveling mast to produce, for example, a scanning spotlight. It is anticipated that a motor may be installed within the mast to swivel the payload either according to some internal logic or according to an external control.

It is anticipated that multiple tension cables may be used within the mast's core, to provide added force in order to improve the secure attachment of the mast to the surface of attachment.

It is anticipated that multiple tension cables may be used outside of the mast's core, to provide added force in order to improve the secure attachment of the mast to the surface of attachment.

It is anticipated that the tensioning cable may be fastened to the surface of attachment by passing through an eyelet or similar part on the surface of attachment, then doubling back and fastening to an eyelet or similar point of attachment on the base or mast.

It is anticipated that the tension cable, in order to provide required strength for a given application, may be constructed using a combination of semi-flexible materials and mechanisms including but not limited to elastomeric plastics, rubber bands, bungee cords, metal coils, springs, braided line and spring-loaded mechanisms.

It is anticipated that the mast may be telescopic, varying in length to allow for easy storage and deployment.

In another embodiment of the mast of this invention, the base has individual fins or legs which are spring-loaded or otherwise mechanically capable of compressing in opposition to force applied toward the mast by the surface of attachment, and further capable of individually compressing as each respective foot comes in contact with the surface of attachment, and thereby maintaining multiple points of pressure on the contoured or irregular surface of attachment while the tension cable is locked; and otherwise restored to their original extended disposition when the tension cable is released. The friction resulting from the forced mating of the feet and the surface of attachment contributes to the stability of the mast.

It is anticipated that the force of opposition provided by a resilient compressible base may be supplied by a variety of means, including mechanical means such as hydraulic, electrical or pneumatic systems.

It is anticipated that the force of opposition provided by a resilient compressible base may be controlled by computer logic to calculate and regulate pressure at one or more points between the base and the surface to which it is mated.

It is anticipated that the force of opposition provided by a resilient compressible base may be controlled by computer logic to calculate and regulate tension on the mast's internal tension cable.

It is anticipated that the forces required to compel a resilient compressible base to act in opposition to the surface of attachment may be supplied by means other than a tension cable, including magnetic means.

It is anticipated that the forces required to compel a resilient compressible base to act in opposition to the surface of attachment may be supplied by means other than a tension cable, including manual pressure applied during installation of the mast to compress the base; and fastening means to manually or automatically lock onto the surface of attachment to maintain its disposition in oppositional resistance to the compressed base.

In another embodiment of the mast of this invention, the mast is capable of communicating via physical network or wirelessly with other masts and remote devices to share data and act on data in order to ensure the proper positioning and functioning of a single shared payload.

Figure 14:
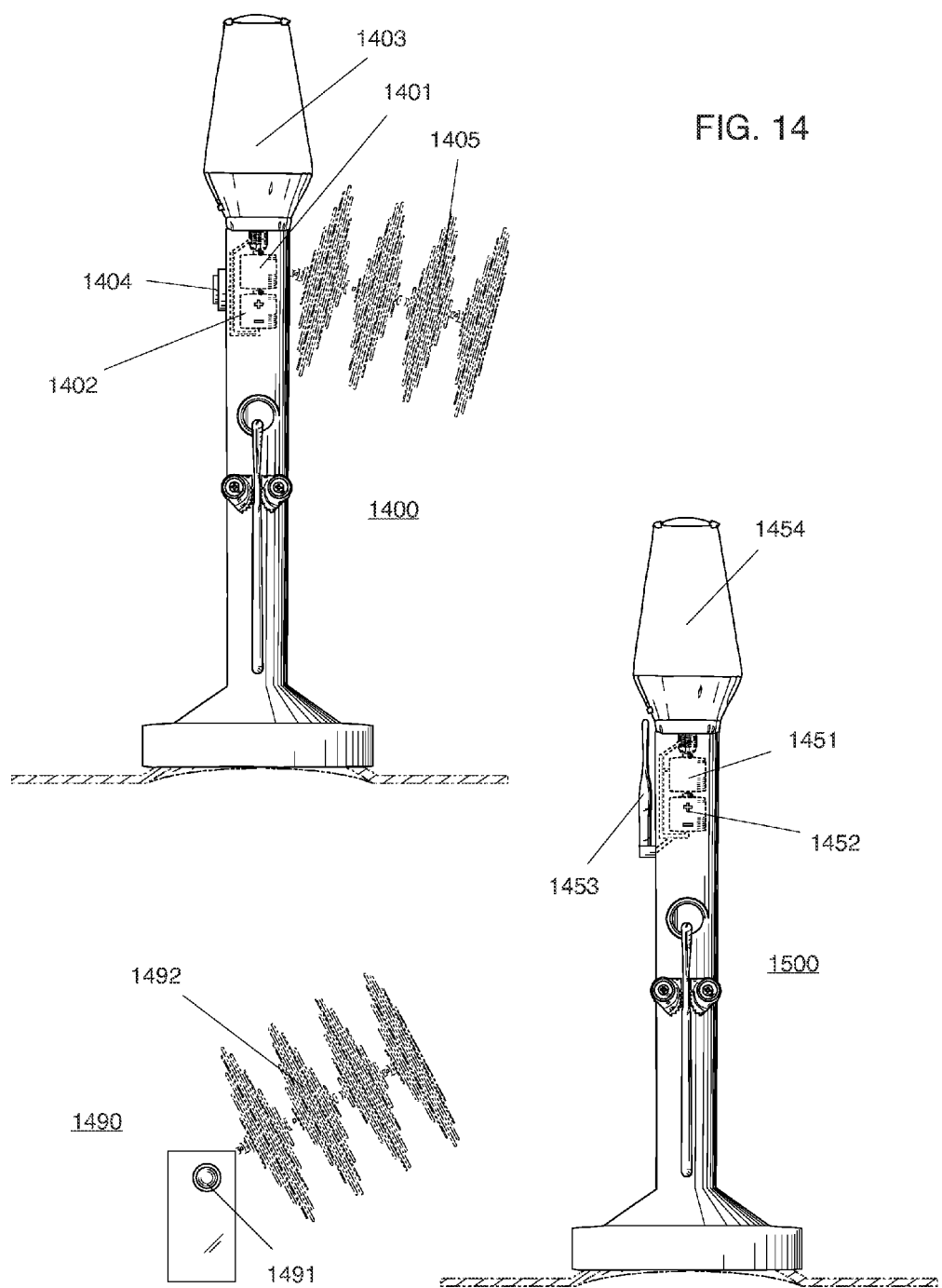
FIG. 14 shows two stern lights as example masts of this invention capable of communicating with each other to synchronize operations of a payload; and also shows a remote control unit capable of operating electronics housed within an example mast of this invention.

An example of this embodiment, namely two separate masts that communicate with one another, are shown in FIG. 14. Mast 1400 contains wireless transmitter 1401 powered by battery pack 1402. Upon activation of manual switch 1404, lamp 1403 is turned on and transmitter 1401 sends a signal as shown at 1405 to mast 1450. Mast 1450 has data receiver 1451, powered by battery pack 1452. Receiver 1451 receives signal 1405 from transmitter 1401 at antenna 1453 and switches on lamp 1454 without need for a manual switch on mast 1450. Remote control transmitter 1490, with manual switch 1491, is also capable of sending signal 1492 to receiver 1451 in order to turn on lamp 1454.

Figure 15:
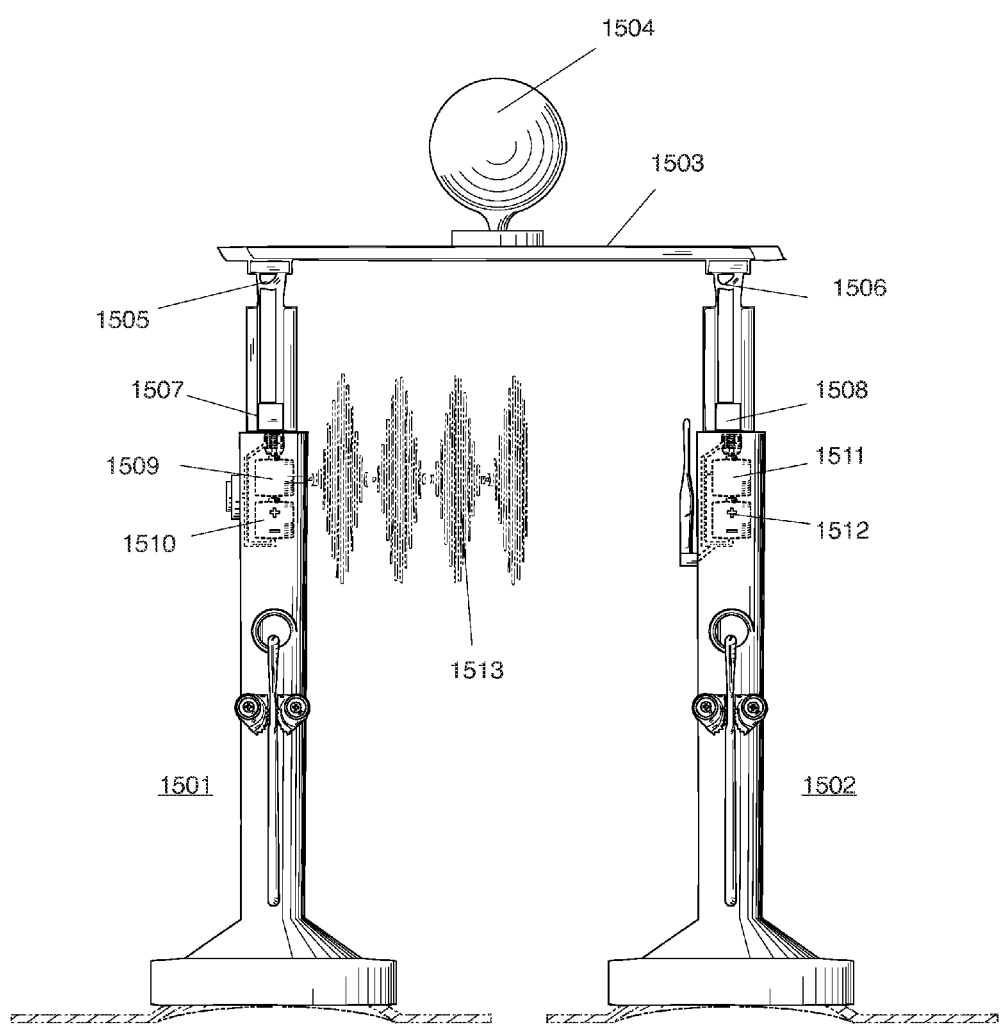
FIG. 15 shows two masts of this invention capable of communicating with each other to synchronize movement of a common payload.
Figure 16:
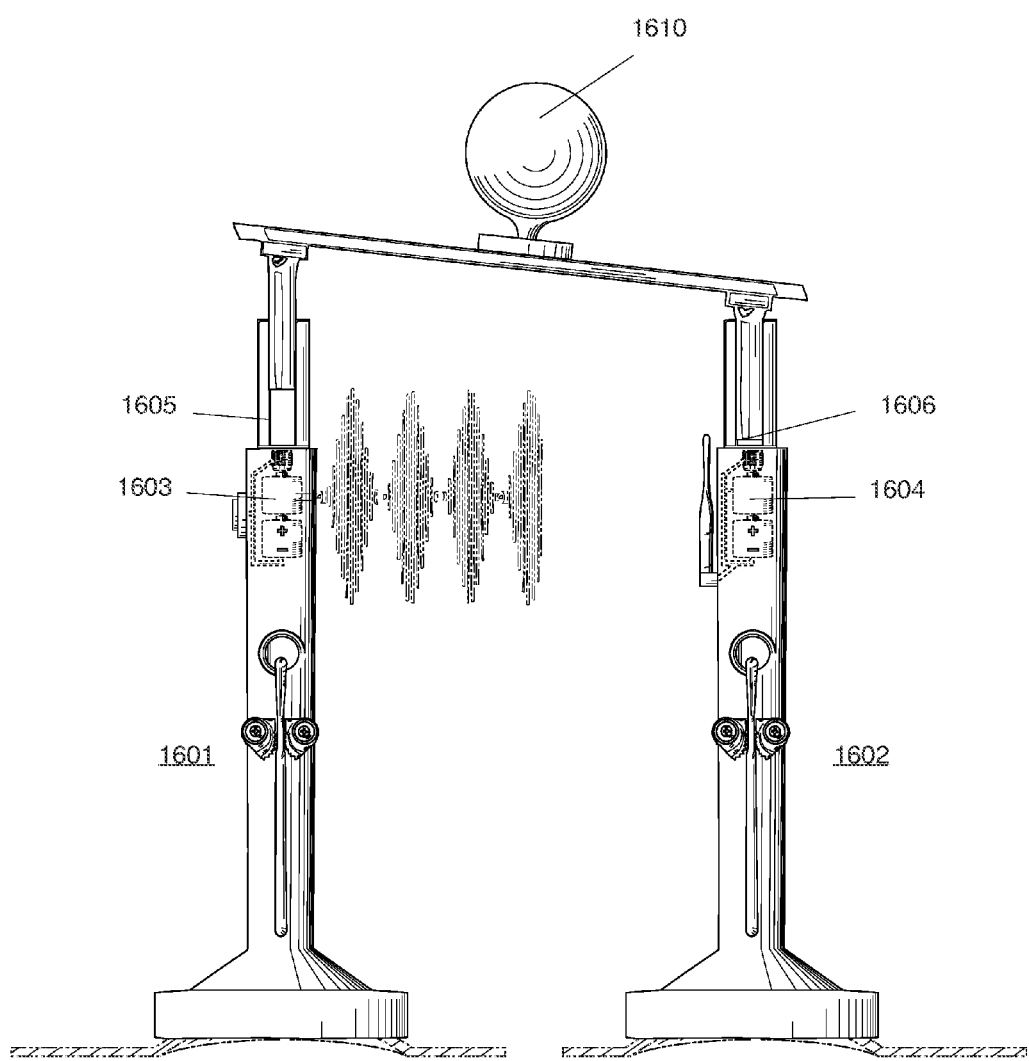
FIG. 16 shows the two masts of FIG. 15 after the masts have synchronized a movement of the common payload.

An example of collaborating masts is shown in two different states, the first state depicted in FIG. 15 and the second state of the same setup depicted in FIG. 16. As shown in FIG. 15, masts 1501 and 1502 together support beam 1503. Atop beam 1503 is ball 1504 which itself is a conventional ball mount capable of receiving a variety of socketed cradles for electronic devices. Beam 1503 is connected to masts 1501 and 1502 at ball and socket joints 1505 and 1506 respectively. Solenoids 1507 and 1508 are capable of pushing or pulling respective ends of the payload. Transmitter 1509 is powered by battery pack 1510 and is capable of communicating with receiver 1511 powered by battery pack 1512. A signal emitted from transmitter 1509 to receiver 1511 is shown at 1513.

A second view of the collaborating masts of FIG. 15 is shown in FIG. 16, at a later state. Here, transmitter 1603 on mast 1601 has sent a signal to receiver 1604 on mast 1602, instructing solenoid 1606 to retract in synchronization with the concurrent extension of solenoid 1605. Ball 1610 is inclined according to the actions of the two solenoids working in collaboration with one another.

It is not necessary for collaborating masts to host a common payload. In another embodiment of the mast of this invention, the mast is capable of being employed in combination with other masts, each mast having a unique payload, each mast in communication with the other masts to ensure proper positioning and functioning of the payloads to form a constellation of masted payloads cooperating with one another. For example, one mast may hold a power generator as its payload while a second mast holds an engine that requires power from the generator. The first mast may be capable of communicating with the second mast, and making the necessary adjustments to the generator's position, to ensure that the generator's plug is correctly aligned with the payload's socket to provide power to the engine.

In another embodiment of this invention, the mast may be capable of cooperating with other masts to affect the function and orientation of a constellation of payloads. In the above example, for instance, the mast holding the battery pack may be capable of learning from the second mast where the payload requiring power is located, and then repositioning itself to plug the battery pack into the second payload.

While the mast of the aforementioned embodiments are expected to host a payload on its distal end, offset from the mast's base at its proximal end by an extension such as a columnar mast pole, it is anticipated that various configurations of masts include those with virtually no distance between the top of the base and the payload. In this regard, the universal adaptor head may essentially be unified with the mast's base, offset from the surface of attachment only by the base itself.

While the mast of this invention may have a universal adaptor head such as a ball for managing a variety of payloads and allowing for adjustment of orientations, it is anticipated that the base and pole of the same mast may also be highly sophisticated, including joints, mechanics, motors, logic, communications network, remote control capability and otherwise capable of effecting the orientation of a payload relative to the surface of attachment.

It is anticipated that the actions of a mast's universal adaptor head may be mechanized or instructed in concert with the actions and logical operations of the other parts of the mast.

It is anticipated that a mast and universal adaptor head of this invention may be devoid of electronic capabilities, simply providing a solid and secure attachment for a variety of payloads.

It is anticipated that the universal adaptor head may be fixed to the mast, such as a ball molded in plastic to the top of the mast pole, while allowing for re-orientation of the payload, such as in the case where the payload has a socket which can be rotated around the aforementioned ball.

It is anticipated that the universal adaptor head may be mechanized to allow for motorized adjustment of the payload's orientation.

It is anticipated that a mechanized universal adaptor head may be remotely controlled by a human operator or by the instructions of a remote computer not contained within the mast.

It is anticipated that the universal adaptor head may contain logic or may communicate with logic elsewhere within the mast to ensure the proper positioning and operations of the payload.

It is anticipated that the universal adaptor head may have sensors to determine the physical state and electronic status of the payload.

It is anticipated that the underside of the mast's base may have a standardized electronic plug to automatically mate with the surface of attachment when the mast is placed on the surface of attachment, in order to receive and transmit power and electronic logic to the mast and payload.

It is anticipated that a wire with a universal electronic adaptor may be integrated with the mast to plug into the surface of attachment or external device in order to provide power and data to the mast and payload.

It is anticipated that the mast of this invention may contain wireless communications devices and antennas capable of receiving and transmitting data to the payload and external devices.

It is anticipated that the mast of this invention may be capable of mechanically repositioning its own base relative to the surface of attachment; and further capable of detaching and reattaching any fastening system marrying the base to the surface of attachment.

It is anticipated that the mast of this invention may contain a power source such as a battery pack or solar cells, capable of powering the payload.

It anticipated that a number of innovations described herein, such as those described with respect to the universal adaptor head may be used to improved the functionality of ordinary masts with a wide variety of bases, including a simple base that is weighted acting in response to gravitational forces to maintain friction with the surface of attachment; or a magnetic base attracted to the surface of attachment; or a base using a vacuum such as a suction cup; or any means that allows the mast's base to provide stability in its marriage with a surface of attachment.

It is anticipated that a number of innovations described herein, such as those described with respect to the universal adaptor head may be used to improve the functionality of a mast that has been permanently affixed to or otherwise unified with a surface of attachment.

It is anticipated that a number of innovations described herein, such as those described with respect to the universal adaptor head may be used to improve the functionality of a mast that has a relatively insignificant distance between a desired payload in and the surface of attachment. For example, the slim, weighted Apple iPod dock, which supports a payload (e.g. iPod) at a distance of approximately ½" from the surface of attachment, may benefit from innovations described herein.

It is anticipated that a number of innovations described herein may be combined to produce unique embodiments of this invention.

CONCLUSION

The foregoing Detailed description has disclosed to those skilled in the relevant disciplines how to make and use the masts of the invention and has also disclosed the best mode presently known to the inventor of making and using such masts. It will however be immediately apparent to those skilled in the relevant disciplines that masts made according to the principles of the invention may be implemented in many ways other than the ways disclosed herein. For example, the mast and cable guide may be manufactured as a unified part. Further, the function of a tension cable may be performed by a coil spring. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A portable mast for supporting a payload on a surface of attachment comprising:
   a substantially tubular center column that supports a payload at its distal end, a proximal end of the tubular center column comprising a base that defines an opening into the tubular center column, the base having at least one point of contact for mating to the surface of attachment;
   a cable housed within the tubular center column with its first end emerging from the opening at the base and its second end emerging from an opening on the tubular center column away from the base, the first end of the cable terminated by a detachable fastener for securing the cable to the surface of attachment and the second end of the cable terminated by a stop that prevents the cable from being fully withdrawn into the tubular center column;
   a means for maintaining tension on the cable when the fastener is secured to the surface of attachment for the purpose of maintaining contact between the at least one point of contact and the surface of attachment, wherein the means for maintaining tension on the cable restricts at least a portion of the cable emerging from the opening on the tubular center column away from the base from being withdrawn into the tubular center column; and
   the tubular center column restricting the first end of the cable and its fastener from being fully withdrawn into its interior and removed through the opening on the tubular center column away from the base.

2. The mast of claim 1 wherein:
the opening on the tubular center column away from the base has an edge condition that is sufficiently rounded to prevent abrasion of the cable.

3. The mast of claim 2 wherein:
the opening on the tubular center column away from the base forms the mouth of a tubular cable guide within the tubular center column to house the cable and guide the cable toward the base so that the cable emerges from the cable guide generally along the central axis of the base.

4. The mast of claim 1 wherein:
the fastener is at least one of swivel clips, breech clips, spring clips, hooks, suction cups and magnets.

5. The mast of claim 1 wherein:
the means for maintaining tension on the cable when the fastener is secured to the surface of attachment is a cleat on the exterior surface of the tubular center column.

6. The mast of claim 5 wherein:
the cleat is at least one of jam cleats, clam cleats and cam cleats.

7. The mast of claim 1 wherein:
the means for maintaining tension on the cable when the fastener is secured to the surface of attachment is an adjustable cord lock adapted to releasably restrict the portion of the cable emerging from the opening on the tubular center column away from the base from being withdrawn into the tubular center column.

8. The mast of claim 1 wherein:
the means for maintaining tension on the cable comprises a key-lock mechanism configured to prevent release of tension on the cable by unauthroized users.

9. The mast of claim 1 wherein:
the base is bell-shaped to house the fastener and thereby protect the fastener from exposure to corrosive weather conditions and tampering by unauthorized users.

10. The mast of claim 1 wherein:
the at least one point of contact on the base is compressible to conform to an irregular surface of attachment; and to maintain pressure on the surface of attachment as the cable is pulled into tension; and to protect the surface of attachment from impacts on the mast; and to protect the mast and its payload from impacts on the surface of attachment.

11. The mast of claim 1 wherein:
the cable is elastic.

* * * * *